US010459293B2

(12) United States Patent
Finnemeyer et al.

(10) Patent No.: US 10,459,293 B2
(45) Date of Patent: Oct. 29, 2019

(54) METHODS AND APPARATUS FOR LIQUID CRYSTAL PHOTOALIGNMENT

(71) Applicant: Massachusetts Institute of Technology, Cambridge, MA (US)

(72) Inventors: Valerie A. Finnemeyer, Kent, OH (US); Robert K. Reich, Tyngsborough, MA (US); Harry R. Clark, Townsend, MA (US); Carl O. Bozler, Waltham, MA (US); Shaun R. Berry, Chelmsford, MA (US); Philip J. Bos, Hudson, OH (US); Douglas R. Bryant, Aurora, OH (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 16/117,468

(22) Filed: Aug. 30, 2018

(65) Prior Publication Data

US 2018/0364526 A1 Dec. 20, 2018

Related U.S. Application Data

(62) Division of application No. 14/845,924, filed on Sep. 4, 2015, now abandoned.
(Continued)

(51) Int. Cl.
*G02F 1/1337* (2006.01)
*G02F 1/1333* (2006.01)
*C09K 19/56* (2006.01)

(52) U.S. Cl.
CPC ........ *G02F 1/133711* (2013.01); *C09K 19/56* (2013.01); *G02F 1/133377* (2013.01);
(Continued)

(58) Field of Classification Search
CPC ........ G02F 1/133711; G02F 1/133377; G02F 1/133788; G02F 2202/043;
(Continued)

(56) References Cited

U.S. PATENT DOCUMENTS 7,754,295 B2 7/2010 Chari et al.
2007/0268723 A1 11/2007 Weng et al.
(Continued)

FOREIGN PATENT DOCUMENTS

WO 2005006034 A2 1/2005

OTHER PUBLICATIONS

Andre Y. et al. "Infrared video camera at 10 ?m", Applied Optics, vol. 18, No. 15, (Aug. 1, 1979), p. 2607-2608.
(Continued)

*Primary Examiner* — Shan Liu
(74) *Attorney, Agent, or Firm* — Smith Baluch LLP

(57) ABSTRACT

Liquid crystal photonic devices and microcavities filled with liquid crystal materials are becoming increasingly popular. These devices often present a challenge when it comes to creating a robust alignment layer in pre-assembled cells. Previous research on photo-definable alignment layers has shown that they have limited stability, particularly against subsequent light exposure. A method of infusing a dye into a microcavity to produce an effective photo-definable alignment layer is described, along with a method of utilizing a pre-polymer infused into the microcavity mixed with the liquid crystal to provide photostability. In this method, the polymer layer, formed under optical irradiation of liquid crystal cells, is effectively localized to a thin region near the substrate surface and thus provides a significant improvement in the photostability of the liquid crystal alignment.
(Continued)

This versatile alignment layer method, which can be used in microcavities to displays, offers significant promise for new photonics applications.

12 Claims, 25 Drawing Sheets

Related U.S. Application Data

(60) Provisional application No. 62/046,706, filed on Sep. 5, 2014.

(52) U.S. Cl.
CPC ............... *G02F 1/133788* (2013.01); *G02F 2001/133726* (2013.01); *G02F 2202/043* (2013.01)

(58) Field of Classification Search
CPC ....... G02F 2001/133726; G02F 1/1334; G02F 2001/13345; G02F 1/1337; G02F 1/13378; G02F 1/133707; G02F 1/133753; G02F 1/133784; G02F 1/3775; G02F 1/133719; G02F 1/0027; G02F 1/141; G02F 2001/133738; G02F 2001/133769; G02F 2001/133776; G02F 2001/13787; G02F 2001/133746; G02F 2001/133749; G02F 2001/133773; G02F 2001/3548; G02F 2001/133742; G02F 2001/133761; G02F 2202/00; G02F 2202/02; G02F 2202/021; G02F 2202/022; G02F 2202/023; G02F 2202/025; G02F 2202/20; G02F 2202/30; G02F 2202/34; G02F 2202/36; G02F 2202/42; G02F 1/133703; G02F 2001/133715; G02F 2001/133796; G02F 1/133734; G02F 2202/04; G02F 2202/14; G02F 1/133308; G02F 1/133608; G02F 2001/133311; G02F 2001/133314; G02F 2001/133317; G02F 2001/13332; G02F 2001/133322; G02F 2001/133325; G02F 2001/133328; G02F 2001/133331; G02F 2001/133334; C09K 19/56; C09K 2019/548; C09K 19/04; C09K 19/38; C09K 19/60; G09G 2300/0495; G09G 2300/0486; H01L 21/02211; H05K 3/389; C08F 259/08; Y10T 428/10; Y10T 428/1005; Y10T 428/1009; Y10T 428/1041; B32B 2457/202; B32B 17/10504; B32B 2305/55; G03F 7/0007; G03F 7/0005; G02B 5/22; G02B 5/223; G02B 5/23; G02B 5/3008; G02B 5/3058; G02B 5/305
USPC .......... 349/86–94, 123–136, 58–60; 428/1.1, 428/1.2, 1.21, 1.31
See application file for complete search history.

(56) References Cited

U.S. PATENT DOCUMENTS

| | | | |
|---|---|---|---|
| 2010/0267858 A1 | 10/2010 | Lub et al. | |
| 2011/0116020 A1* | 5/2011 | Galstian | G02F 1/1303 349/84 |
| 2011/0122362 A1* | 5/2011 | Galstian | G02F 1/133711 349/191 |
| 2012/0113318 A1* | 5/2012 | Galstian | B29D 11/00298 348/374 |
| 2013/0027639 A1 | 1/2013 | Chien et al. | |
| 2013/0050624 A1 | 2/2013 | Kim et al. | |
| 2013/0248868 A1 | 9/2013 | Jung et al. | |
| 2014/0252666 A1* | 9/2014 | Tabirian | B29D 11/00788 264/1.34 |
| 2014/0307215 A1 | 10/2014 | Lee et al. | |
| 2015/0029453 A1* | 1/2015 | Guo | C09B 69/106 349/123 |
| 2015/0205153 A1 | 7/2015 | Sugitani et al. | |
| 2015/0212360 A1* | 7/2015 | Lee | G02F 1/133377 349/42 |
| 2016/0109760 A1 | 4/2016 | Finnemeyer et al. | |

OTHER PUBLICATIONS

Biatinica M. et al., "(U) Uncooled IR Detectors for Air-To-Ground Missile Applications", Critical Technology, (Mar. 9, 2012), 14 pages.
Chen Ch. et al., "Loss-reduced photonic liquid-crystal fiber by using photoalignment method", Applied Optics, vol. 49, No. 26, (Sep. 10, 2010), p. 4846-4850.
Chigrinov V. et al., "Anchoring properties of photoaligned azo-dye materials", Physical Review, vol. 68, (2003), p. 061702-1-061702-10.
Chigrinov V. et al., "Diffusion model of photoaligning in azo-dye layers", Physical Review, vol. 69, (2004), p. 061713-1-061702-5.
Chigrinov V. et al., "Liquid crystal photoalignment: history and future", Emerging Liquid Crystal Technologies II (edited by Liang-Chy Chien), Proc. of SPIE, vol. 6487, (2007), 15 pages.
Chigrinov V. et al., "Photoalignment and photopatterning in liquid crystal photonics", Proc. of SPIE, vol. 8279, (2012), 9 pages.
Chipman R. "Polarimetry", Handbook of Optics-Polarimetry, vol. II, Chapter 22, Second Edition, (1995), 37 pages.
Chirgrinov, "Liquid Crystal Photoalignment: A New Challenge for Liquid Crystal Photonics" Photonics Letters of Poland, vol. 2, No. 3, (Sep. 30, 2010) p. 104-106.
Chung et al., "Polarized UV cured reactive mesogens for fast switching and low voltage driving liquid crystal device" Optics Express, vol. 22, No. 18, (Sep. 8, 2014) 9 pages.
Chychlowski M. et al. "Photo-Induced Orientation of Nematic Liquid Crystals in Microcapillaries", Acta Physica Polonica A, vol. 118, No. 6, (2010), p. 1100-1103.
Datskos P. et al. "Performance of uncooled microcantilever thermal detectors", Review of Scientific Instruments, vol. 75, No. 4, (Apr. 2004), 15 pages.
Ertman S. et al., "Patterned alignment of liquid crystal molecules in silica micro-capillaries", Liquid Crystals, vol. 40, No. 1, (2013), p. 1-6.
Ertman S. et al., "Photo-induced molecular alignment in Photonic Liquid Crystal Fibers", Proc. of SPIE, vol. 6608, (2007), p. 660809-1-660809-5.
Finnemeyer V. et al., "Versatile alignment layer method for new types of liquid crystal photonic devices", Journal of Applied Physics—American Institute of Physics, Jul. 21, 2015), 20 pages.
International Search Report and Written Opinion issued by the International Searching Authority related to PCT/US15/48548, dated Dec. 4, 2015.
Kawatsuki, "Photoalignment and Photinduced Molecular Reorientation of Photosensitive Materials" Chem. Lett., vol. 40, (2011) p. 548-554.
Kedar Sathaye. "Structuring of Liquid Crystals for Optical Technologies." Optics [physics.optics].Telecom Bretagne, Universite de Bretagne-Sud, 2012.
Kim et al., "Enhancement of an Azimuthal Anchoring Energy in a Photo-alignment Layer by Stacking Planar Alignment Layer," IDW (2013), pp. 114-116.
Kim et al., "Stabilization of the liquid crystal director in the patterned vertical alignment mode through formation of pretilt angle by reactive mesogen", Applied Physics Letters, (2007), 90, p. 2619101-1-261910-3.
Lee J. et al., "Novel surface-stabilized vertical alignment mode for fast-response liquid crystal display", Journal of Display Technoogy, (May 2012), vol. 8, No. 5, p. 296-298.

(56) References Cited

OTHER PUBLICATIONS

Liu W. et al. "Performance of uncooled microcantilever thermal detectors", Proc. of SPIE, vol. 7780, (2010), p. 77800M-1-77800M-6.

Lu L. et al., "Mechanism of electric-field-induced segregation of additives in a liquid-crystal host", Physical Review, 86, (2012), p. 051706-1-051706-5.

Moon et al., "Effects of surface modification with reactive mesogen on the anchoring strength of liquid crystals" Journal of Applied Physics, vol. 113 No. 234504 (2013) 5 pages.

Oh et al., "Near-zero pretilt alignment of liquid crystals using polyimide films doped with UV-curable polymer" Optics Express, vol. 23 No. 2 (Jan. 16, 2015) 8 pages.

Oleg et al., "Photoalignment properties of brilliant yellow dye." Proceedings of IDW. vol. 7. 2007, p. 1665-1668.

Skidmore G. et al., "(U) Status of Uncooled Detectors and Camera Systems at DRS", Critical Technology, (Mar. 2, 2011), 9 pages.

Tie W. et al., "Reducing driving voltage and securing electro-optic reliability of in-plane switching liquid crystal display by applying polysulfone photoalignment layer with photoreactive mesogens", Liquid Crystals, vol. 41, No. 8, (May 23, 2014), p. 1057-1064.

Vretik et al., "6. New strategy in development of liquid crystal photoaligning materials with reactive C=C bonds," Transworld Research Network (2011), pp. 153-189.

Wagner M. et al., "Solid State Optical Thermal Imagers", Proc. of SPIE, vol. 6542, (2007), p. 65421P-1-65421P-10.

Yaroshchuk O., et al., "Azodyes as Photoalignment Materials for Polymerizable Liquid Crystals", Japanese Journal of Applied Physics, vol. 46, No. 5A, (2007), p. 2995-2998.

Yaroshchuk O., et al., "Photoalignment of liquid crystals: basics and current trends", Journal of Materials Chemistry, vol. 22, (2012), p. 286-300.

Yaroshchuk O., et al., "Stabilization of liquid crystal photoaligning layers by reactive mesogens", Applied Physics Letters, vol. 95, (2009), p. 021902-1-021902-3.

* cited by examiner

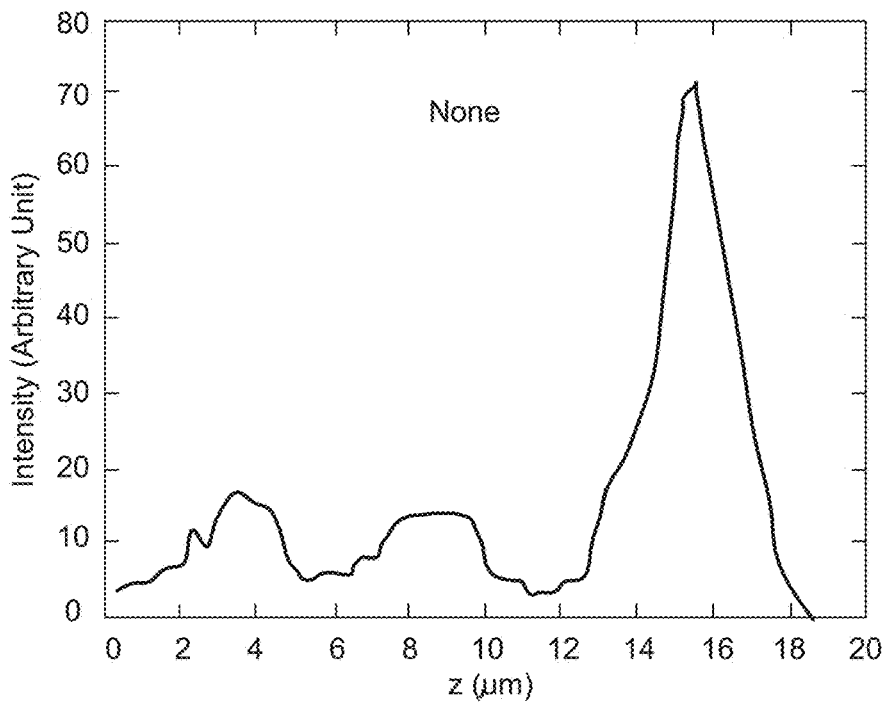
FIG. 3B-I
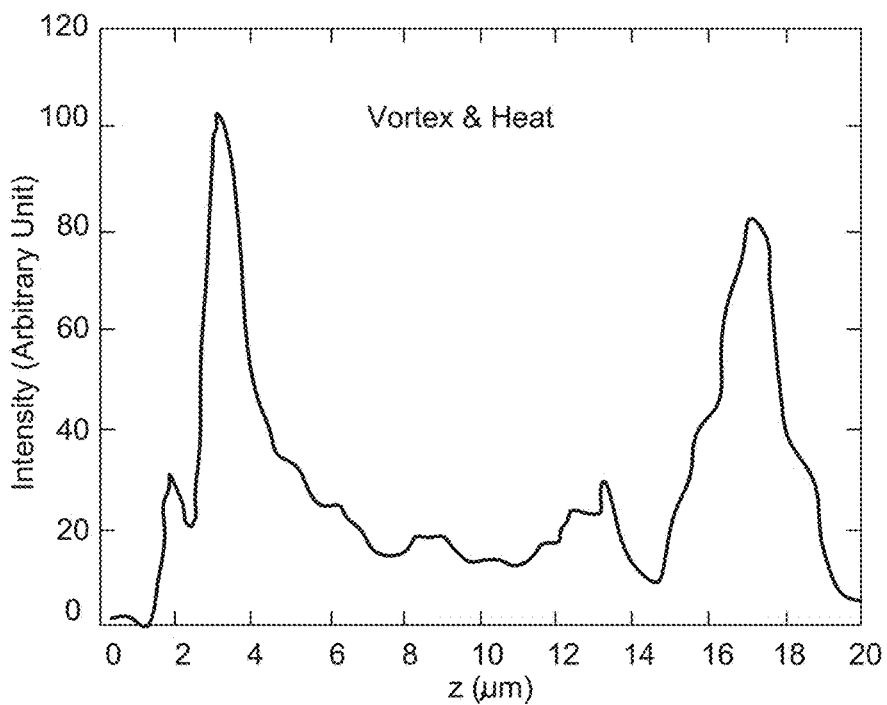
FIG. 3B-II

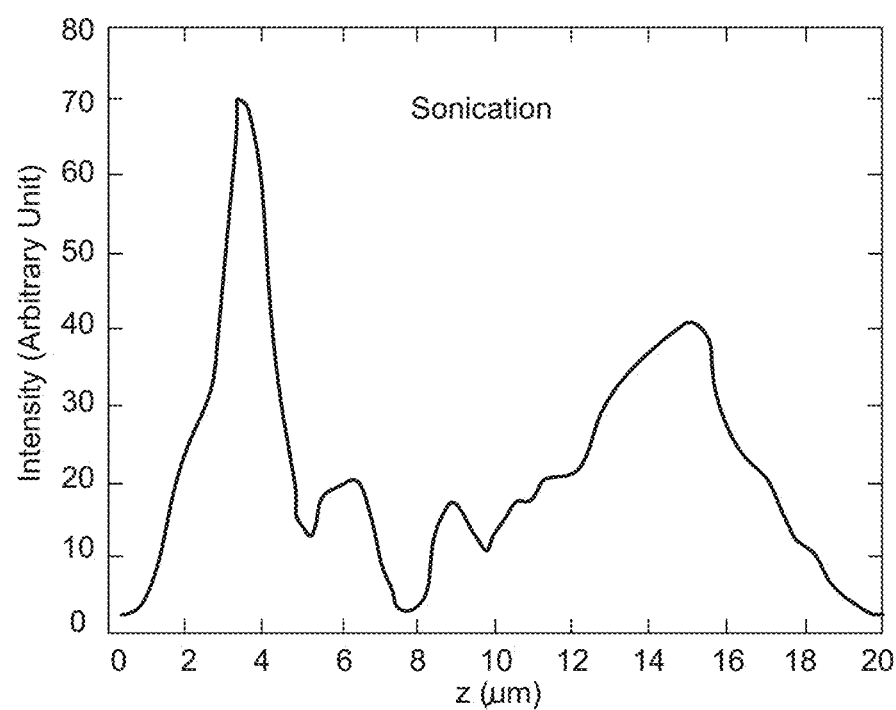
FIG. 3B-III

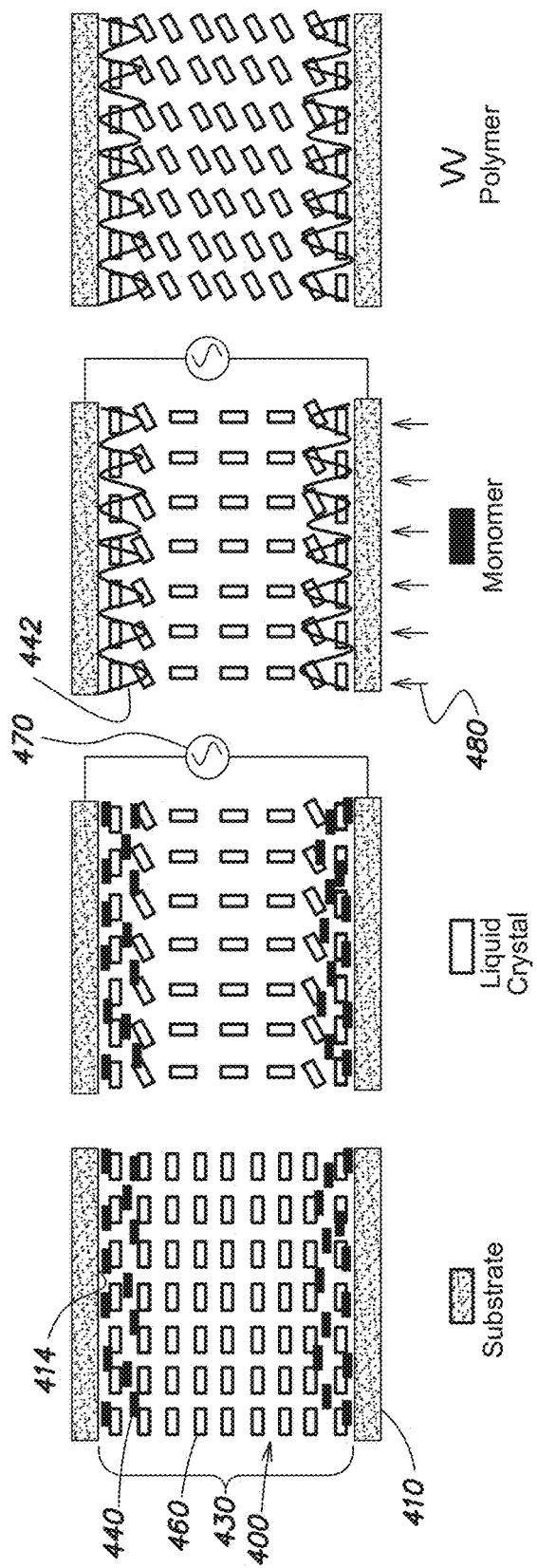

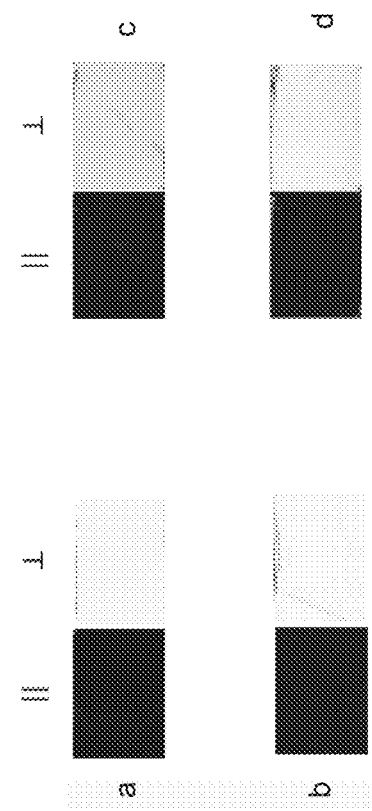
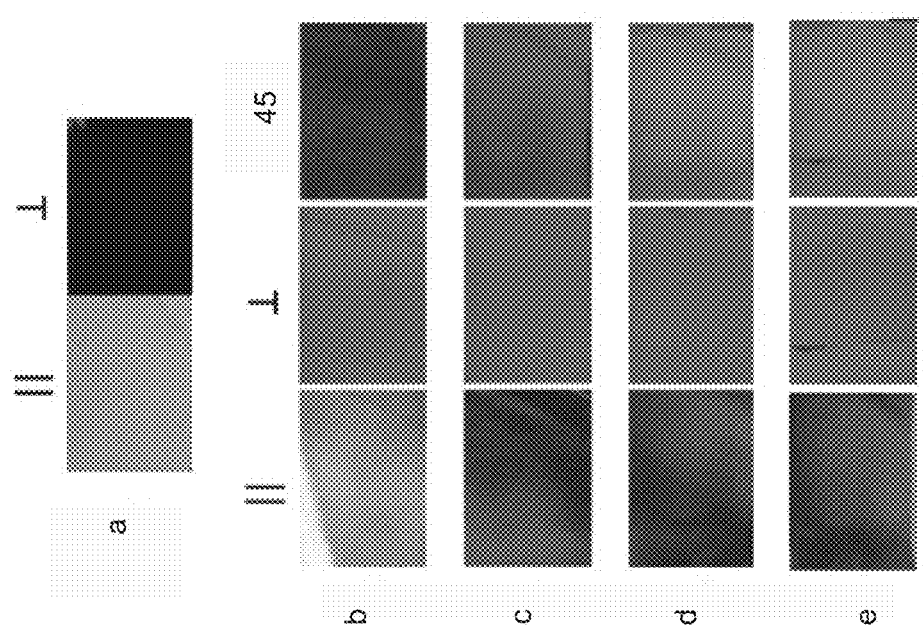
FIG. 8B
FIG. 8A

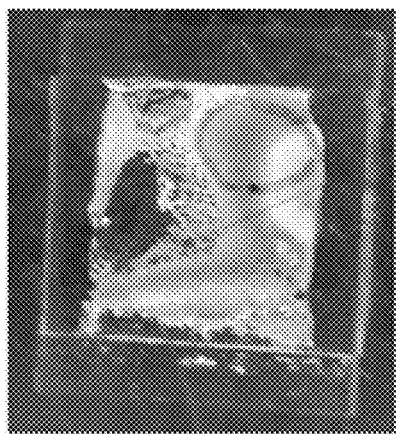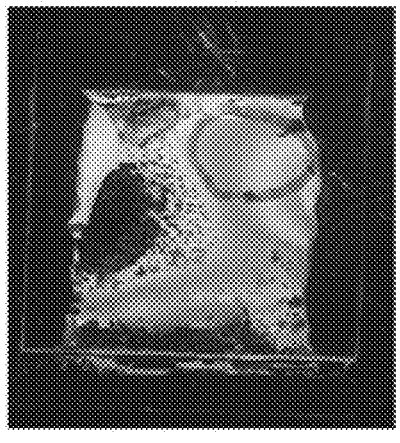
FIG. 13A
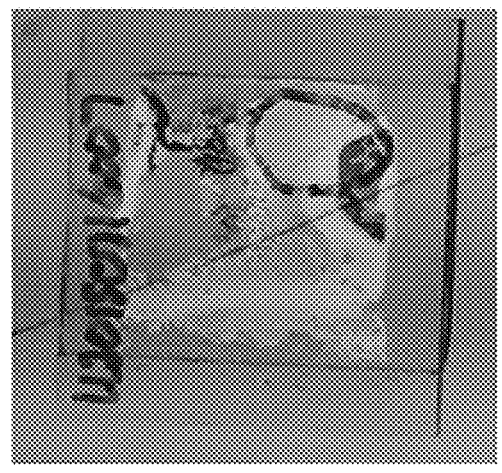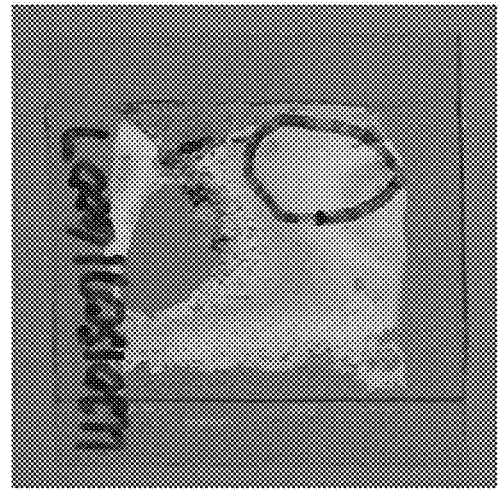
FIG. 13B

METHODS AND APPARATUS FOR LIQUID CRYSTAL PHOTOALIGNMENT

CROSS-REFERENCE TO RELATED APPLICATION(S)

This application is a divisional of U.S. application Ser. No. 14/845,924, entitled "Methods and Apparatus for Liquid Crystal Photoalignment" and filed on Sep. 4, 2015, which in turn claims the priority benefit under 35 U.S.C. § 119(e) of U.S. Application No. 62/046,706, entitled "Methods and Apparatus for Liquid Crystal Photoalignment" and filed on Sep. 5, 2014. Each of these applications is hereby incorporated by reference herein.

GOVERNMENT SUPPORT

This invention was made with government support under Contract No. FA8721-05-C-0002 awarded by the U.S. Air Force. The government has certain rights in the invention.

BACKGROUND

Liquid crystals (LCs) are materials that flow like liquid with crystalline solid-like ordered molecules that align and orient along a particular direction in the presence (or absence) of an electric field. These materials are widely used to manipulate the polarization and transmission of light, including in liquid crystal displays (LCDs). In an LCD, an LC layer is usually formed by aligning the LC material with respect to a pair of substrates and sandwiching the substrates between a pair of crossed polarizers. Applying an electric field to the LC layer causes the LC to align or twist, thereby allowing or blocking the incident light.

Typically, the LC material is aligned to the substrate with an alignment layer. The alignment layer is typically applied through a standard spin-coating method with a layer thickness on the order of several hundred nanometers. This layer orients the LC molecules, which often have an oblong shape, along a surface of the substrate, which is typically transparent glass or plastic. This type of alignment causes most or all of the LC material to form a "single crystal" that can be re-oriented using an electric field. Absent this alignment layer, the liquid crystals would behave as a "polycrystalline" material; that is, the LC layer would form smaller LC domains, each containing molecules aligning in an orientation different from those of other LC domains. Light passing through a polycrystalline LC layer undergoes non-uniform scattering and random variation in light transmission, producing diffused, low-intensity lighting.

One of the most common ways to provide liquid crystal alignment is by first coating the surface with a thin film of polymer, such as polyimide, and then rubbing the surface with a cloth. The cloth aligns the polymer molecules on the surface in the rubbing direction; the liquid crystal in contact with the surface aligns to the polymer molecules. This approach has been quite effective, and thus widely used in the LCD industry. Although this rubbing alignment technique is generally applicable to display technologies that work with large, flat display platforms and substrates, it may not be applicable to particular LC applications that utilize non-planar, non-standard, and/or smaller cavities to hold LC. In addition, the rubbing an alignment layer with a cloth tends to generate particles, making it suitable for certain applications.

Other techniques for aligning LC materials include a photoalignment technique, which utilizes polarized light to form an alignment layer for LC materials. Photoalignment case be used in a variety of non-standard geometries. For instance, photoalignment has been utilized in the creation of a tunable microresonator in which the alignment layer is applied through a standard spin-coating method. Great success has also been shown in the use of photoalignment for tunable photonic crystal fibers (PCFs). In this case, the application of the photoalignment layer via spin-coating is not possible; instead, the fiber is filled with the photoalignment solution through capillary action into the fibers, then excess solution is removed through a pressure gradient.

There are a number of different photoalignment techniques which can be categorized by the way in which the polarized irradiation causes surface anisotropy: the polarized light can result in polymerization with cross-linking along one direction (photo-polymerization), it can result in degradation of molecules aligned along one direction (photo-degradation), it can result in a conformational change of molecules along one direction (photo-isomerization), or it can excite molecules preferentially along one direction (photo-reorientation). The last two of these are most commonly accomplished using azo dyes which often absorb well in the ultraviolet (UV) or visible range. While photo-isomerization is frequently criticized as having poor lifetime due to the gradual relaxation of molecules from the cis- to the trans-state, photo-reorientation, depending on the relaxed molecular conformation, is a much more attractive choice because it can be excited preferentially along the polarization. In addition to the lower irradiation energies compared to both photo-polymerization and photo-degradation, photo-reorientation of azo dyes results in an alignment layer with an order parameter which can be even higher than the liquid crystalline order parameter.

In photo-reorientation, a dichroic dye, most often one containing azo groups, is irradiated with polarized light of an appropriate wavelength (i.e., one which is well absorbed by the dye). The probability that a given dye molecule will absorb this incident irradiation is proportional to $\cos^2\theta$ where $\theta$ is the angle between the incident polarization axis and the long axis of the dye molecule. Over time, this absorption increases the population of dye molecules aligned perpendicular to the incident polarization, where the probability of absorption is at or near zero. After a sufficient exposure dose, the order parameter, which is determined by the absorption spectra of the dye both parallel and perpendicular to the polarization axis of the irradiating light, can exceed even that of the liquid crystals it is being used to align.

Anchoring energies of these layers have also been measured to be on the same order of magnitude as the anchoring achieved through rubbed polyimide alignment. This is particularly important in photonic devices where light scattering from director fluctuations can degrade device performance. Anchoring energies on the range of that observed from polyimide and also for azo-dye alignment layers suppress these fluctuations to an acceptable level in some devices. It should be noted that director fluctuations are not a large concern for display devices.

Unfortunately, conventional photo-aligned layers tend to degrade when exposed to light or heat, making them unsuitable for many applications, including displays and thermal sensing. Of particular importance for photonic applications is stability under exposure to light of random polarization states. Also, in the case of photonic devices, the light intensity which the device is subjected to can be quite high, enhancing the probability of device failure if the stability is low. It should be noted that for many applications of azodye alignment layers, the "rewriteability" of these materials is emphasized as a positive attribute. However, in the case of photonic devices where the azodyes are desired for their high anchoring energy, rewriteability is problematic.

SUMMARY

The inventors have recognized that materials called reactive mesogens can be used to address the stability issues that plague conventional photoalignment layers. These materials can be applied as monomers and subsequently exposed to UV light to become polymers. Further, in their monomeric state, reactive mesogens can exist in the liquid crystalline state of matter, but then, after alignment by or to a photoalignment layer, can be polymerized to lock-in their order. Reactive mesogens have been applied by spin coating and have been shown to be effective in stabilizing azo dye materials to thermal stress. They have also been applied as an additive to liquid crystals and shown to be effect in stabilizing against electro-optic stress.

The inventors have also recognized that spin coating reactive mesogen is not applicable to preformed cavity photonic devices and that using reactive mesogen to stabilize liquid crystals against electro-optic stress does not necessarily apply to azo dye materials or the stability of alignment under optical stress. In contrast, the embodiments disclosed herein include photonic devices with preformed cavities containing azo dye materials that are stable to exposure to light of relatively high intensity. Unlike conventional liquid crystal devices, which are formed by assembling two substrates coated with respective alignment layers using spin coating, roller coating, meniscus coating, etc., inventive photonic devices may include "preformed cavities," which often cannot be coated with alignment layers using conventional coating techniques.

More specifically, embodiments of the present technology include liquid crystal (LC) cells and methods of making and using LC cells. An example LC cell includes a structure, such as a substrate, that defines a microcavity; LC material disposed within the microcavity; a dichroic dye layer (e.g., a layer of azo or anisotropic dye) disposed on an inner surface of the microcavity; and a polymerized layer (e.g., polymerized reactive mesogen), disposed on and aligned with the dichroic dye layer, to align the LC material with respect to the dichroic dye layer. The dichroic dye layer may have a thickness of up to about 10 nm and may comprise Brilliant Yellow azo dye. The polymerized layer may have a thickness of up to about 100 nm and may comprise RM257 or another suitable reactive mesogen.

Another embodiment includes a method of aligning liquid crystal material to an inner surface of a microcavity. The method includes infusing anisotropic dye, such as an azo dye or a dye substantially similar to an azo compound, into the microcavity so as to coat the interior surface of the microcavity with the anisotropic dye. The anisotropic dye is illuminated with polarized light so as to form an anisotropic dye layer aligned with respect to the inner surface of the microcavity. Reactive mesogen, such as RM257, and liquid crystal material are infused into the microcavity. The reactive mesogen is illuminated at a wavelength selected to cause polymerization of the layer of reactive mesogen material so as to form a polymerized reactive mesogen layer, which may be <100 nm thick, that aligns the liquid crystal material with respect to the anisotropic dye layer.

In some cases, infusing the anisotropic dye comprises disposing the microcavity in a dye solution comprising the anisotropic dye and a solvent. Once the dye solution has wicked into the microcavity, the microcavity can be heated so as to evaporate the solvent.

Similarly, infusing the reactive mesogen and the liquid crystal material may comprise infusing a mixture of the reactive mesogen, the liquid crystal material, and a photoinitiator into the microcavity. The mixture of the reactive mesogen, the liquid crystal material, and the photoinitiator can have a weight ratio of reactive mesogen to liquid crystal material to photoinitiator of about 1.35 to 98.50 to 0.15. If desired, the mixture of the reactive mesogen, the liquid crystal material, and the photoinitiator may be mixed and/or heated prior to being infused into the microcavity. And the reactive mesogen may be allowed to separate from the liquid crystal material before being illuminated.

In some examples, illuminating the reactive mesogen comprises applying at least one voltage across at least a portion of the microcavity so as to lock in (fix, freeze, hold) alignment of the polymerized reactive mesogen layer with respect to the anisotropic dye layer. If desired, a photoinitiator, such as Irgacure 651, may be infused into the microcavity before illuminating the reactive mesogen with ultraviolet light.

The alignment may be varied by applying different voltages across the microcavity. For example, a first voltage can be applied across a first portion of the microcavity and a second voltage can be applied across a second portion of the microcavity so as to create spatially varying alignment of the anisotropic dye to the liquid crystal material. For example, the spatially varying alignment can be achieved by masking the exposure irradiation during the polymerization step, with one voltage applied and a region of the cavity exposed. Next, a different voltage can be applied and a different region exposed and so on in order to produce spatially varying alignment.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 2I is a set of images showing twist cells prepared with one photoaligned substrate and one rubbed-polyimide substrate, filled with RM257 in BL006 at 0.9% wt (top), 1.2% wt (middle), or 1.5% wt (bottom).

FIGS. 3B-I, 3B-II, and 3B-III show a set of intensity profiles measured along a random vertical cross-section of each image shown in FIG. 3A.

FIG. 4A is an illustration of a filled microcavity containing a mixture of liquid crystal materials and reactive mesogen monomers, which preferentially localizes near the microcavity surfaces.

FIG. 4B is an illustration of the filled microcavity in which the liquid crystal is re-oriented under applied voltage.

FIG. 4C is an illustration of the filled microcavity in which monomers are crosslinked under ultraviolet (UV) illumination to lock in the orientation of liquid crystal.

FIG. 4D is an illustration of the filled microcavity with "oriented" liquid crystal (without an applied voltage).

FIG. 8A shows images of samples filled with pure BL006 (a) before exposure and after (b) 50 minutes, (c) 100 minutes, (d) 150 minutes, and (e) 200 minutes of exposure to about 20 mW/cm$^2$ polarized blue light oriented at 45 degrees to the photoalignment axis.

FIG. 8B shows images of samples filled with 1.5% wt RM257 in BL006 shown between parallel (left) or crossed (right) polarizers (a) before and (b) after exposure to polarized blue light of about 20 mW/cm$^2$ for 21 days and (c) before and (d) after exposure to unpolarized blue light of about 120 mW/cm$^2$ for 21 days.

FIGS. 13A and 13B show RM-stabilized planar cells between polarized crossed at +45 degrees and −45 degrees, respectively, after an additional exposure, in the liquid crystal state, to blue-light polarized at 45 degrees.

DETAILED DESCRIPTION

Figure 1A:
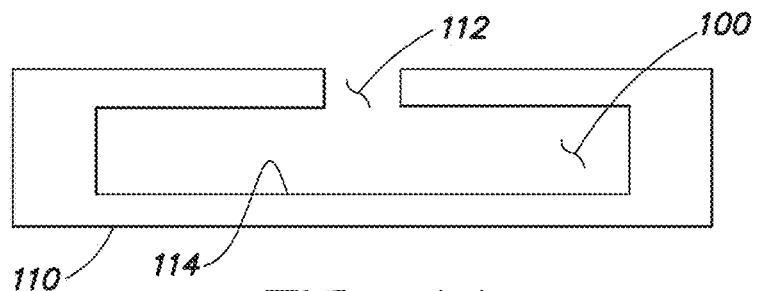
FIG. 1A is a cross-sectional view of a microcavity disposed within a substrate to hold liquid crystal material.

As discussed above, conventional photoalignment involves forming a layer of photo-alignable material, such as a dichroic dye (a dye that absorbs light anisotropically, such as Brilliant yellow or another azo dye), on the substrate surface. A thin coating of the azo dye is placed on the glass or electrode surface, and then blue polarized light is shined upon it. The polarized light aligns the azo dye molecules, which tend to be oblong, perpendicular to the polarization in a semi-permanent position. Unfortunately, azo dye layers are not stable enough for most applications as they tend to degrade when exposed to visible light.

Forming a layer of polymerized reactive mesogen (RM) or another suitable material over the azo dye layer effectively increases the photostability of the azo dye layer to create a more stable alignment layer. This material (e.g., the RM) forms a polymerized layer which, when polymerized, enforces the existing liquid crystalline alignment rather than disrupting it. In other words, acting as an intermediary, the RM aligns with the azo dye layer, and polymerizing of the RM subsequent fixes this alignment. The polymerized and aligned RM, in turn, aligns itself with the liquid crystal material. In other words, polymerizing the RM after the photoalignment material (azo dye) has been properly aligned "locks-in" the imposed alignment direction and protects the azo dye from heat and light exposure. This alignment approach can be applied after almost all fabrication processing steps and can be utilized in any application involving cell geometry with minimal fill-port access.

Using reactive mesogen in photoaligning the azo dye can be applied to non-planar surfaces, such as the inner wall surfaces inside microcavities. Reactive mesogen itself dissolves in liquid crystal materials at low concentrations, but it can become slightly immiscible in the base liquid crystal when the RM polymerizes. In some cases, the process for mixing the reactive mesogen with the liquid crystal can be controlled such that the reactive mesogen deposits out of solution onto the microcavity surface(s). When the RM polymerizes, the polymer network usually agglomerates at the surface because it is much more concentrated than the bulk liquid crystal/reactive mesogen mixture; RM, however, has limited polymerization in the bulk liquid crystal/reactive mesogen mixture because the mixture is usually diluted. Moreover, photostability tests (details of which will be described in later sections) have shown the reactive mesogen on the photoalignment dye layer is very stable over temperature and exposure compared to samples without the reactive mesogen.

RM-stabilized photo-alignment layers can be used in a variety of emerging photonics applications and devices, including but not limited to ring resonators, lenses, and photonic crystal fibers, and uncooled thermal imagers. These imagers comprise high performance, large format, arrays of thermal imaging pixels to detect long wavelength infrared (LWIR) light. In this particular application, aligning the LC material inside micron-sized thermal imaging pixels can no longer be applicable using conventional rubbing technique, as it will be exceeding difficult to apply rubbing alignment technique to any miniature platforms at the micron scale. Other applications include curved displays, planar displays, etc. For example, in large-area applications, the azo dye and RM could be sprayed onto the substrate and illuminated as described below to align the azo dye and polymerize the RM.

The following sections describe techniques for creating photoalignment layers by infiltrating a dissolved photo-definable dye into microcavities through a single micron-sized opening. Also presented is a process to stabilize the photoalignment layer by infiltration into the microcavity of a RM that has been pre-mixed into host LC materials. The layers generated by the process disclosed in this application are relatively thin (e.g., <100 nm thick) and do not exhibit a large degree of light scattering.

I. Stable Photoalignment of Liquid Crystals in Confined Microcavities

A technique is described herein for introducing a stable azo dye photoalignment to confined microcavities with a single entry/exit port. In this method, the azo dye photoalignment layer is introduced to the cell and illuminated with polarized light to form a first alignment layer. A polymer network is then introduced into the cell in the form of a reactive mesogen. In some cases, the reactive mesogen is mixed at low concentration with the liquid crystal, then phase separated to the surfaces and polymerized to form a layer of polymerized reactive mesogen that aligns the liquid crystal to the azo dye layer. This simple method offers high stability against subsequent exposure to both heat and light.

Beneficially, this method also avoids the requirements of strict process control; both the photoalignment dye and the photoinitiator for the polymerization process may absorb in the same wavelength range, in some cases without degradation of the process or decrease in yield.

Previously, the infiltration of reactive mesogen (RM) into the cell along with the liquid crystal has been proposed for creating customizable pretilt which can be patterned throughout the cell. However, the RM used to create the pretilt modified a well-known stable alignment layer (polyimide), not an azo dye layer, so the RM was not expected to stabilize or improve the quality of a weak or easily degraded or poor quality alignment layer.

Stable alignment has many advantages over previous alignment methods. These advantages include low cost, simple manufacturing without the need for expensive and difficult-to-control rubbing processes, no high temperature bakes that limit substrate material selection, and the ability to photopattern the alignment axis and pretilt.

The process of creating a stable azo dye photoalignment layer in confined microcavities may begin with the application of the azo dye layer. A dye solution is prepared in which the azo or other dichroic dye is mixed into an appropriate solvent at low concentrations. The microcavities may be fully submerged in this solution and allowed to soak; this soaking process may provide sufficient time for the dye solution to fully infiltrate the cavities, which will depend on both cavity volume and the area of the entry/exit port. Vacuum-filling of the cavities could also be used if there is no concern about evaporation of the solvent in vacuum.

Next, the microcavity sample is removed from the solution and residue on outer surface removed. The sample should then be immediately placed in an oven or on a heat stage at or near the boiling point of the solvent to force quick evaporation of all solvent and deposition of a uniform dye layer through the microcavities. From this point, processing of the photoalignment layer should continue in the typical fashion; the sample is irradiated with polarized light of an appropriate wavelength to effectively align the dye layer.

A liquid crystal mixture is also prepared containing a low concentration of reactive mesogen along with a photoinitiator. If preferred, a thermal initiator may also be used. Appropriate selection of liquid crystal and reactive mesogen may ensure that the reactive mesogen in the liquid crystal will phase separate as desired.

The mixture is then heated to above the isotropic transition temperature of the liquid crystal and mixed using either vortex mixing or sonication. Once mixed, the solution can be introduced into the cell in any desired manner. The mixture may then be phase separated, allowing the reactive mesogen to aggregate on the cell surfaces. This can be done by, e.g., by simply allowing the mixture time to separate. However, if desired, a low frequency, high voltage can be used to assist in driving the reactive mesogen to the cell surfaces. In this case, the liquid crystalline and reactive mesogen materials may be chosen such that ions in the solution will preferentially associate with the reactive mesogen rather than the liquid crystal; the current will assist in driving those molecules associated with ions to the surface.

After phase separation, the cell is exposed to an appropriate wavelength to activate the photoinitiator (or temperature to activate the thermal initiator). The use of low intensity for this exposure is recommended to allow slow migration of the reactive mesogen as the polymer network begins to form and to avoid any negative effects on the underlying alignment layer. This polymerization can occur either with or without applied voltage; the application of voltage results in a liquid crystal pretilt.

With a sufficient polymer network formed on the substrate surfaces, the alignment originally imposed by the photoalignment layer (the azo dye layer) is locked in by the polymer network (the polymerized RM layer) with or without additional pretilt. Any condition which would cause degradation of the photoalignment layer will now not cause degradation of the liquid crystal alignment in the cell or microcavities.

II. Photoalignment in Microcavities

Microcavity

FIG. 1A shows an exemplary microcavity structure 100 disposed in a substrate 110, with inner surfaces 114 and a single entry/exit port 112. (Other embodiments of the microcavity may have two or more ports for use as separate entry and ports). The substrate 110 in FIG. 1A can be any materials, including but not limited to silicon, silicon oxide, silicon nitride, etc. Depending on the materials of the substrate 110, the microcavity 100 within the substrate 110 can be produced using conventional photolithography techniques including, but not limited to wet-etching; dry-etching; sputter etching; reactive ion etching (RIE), including plasma, radio frequency, and deep RIE; vapor-phase etching; etc. In some embodiments, the shapes of the microcavity 100 can be as followed: the cross-sectional shape of the microcavity 100 can include circle, oval, triangle, square, rectangle, trapezium, diamond, rhombus, parallelogram, pentagon, hexagon, heptagon, octagon, or any other polygonal or 2-dimensional shapes. Possible volumetric shapes of the microcavity 100 include, but not limited to rectangular prism (like a match-box type aspect ratio), triangular prism, pentagonal prism, hexagonal prism, and any polygonal prism, pyramid, tetrahedron, wedge, cube, sphere, cone, cylinder, torus, and any possible aspect ratio of ellipsoids and ellipsoidal dimensions.

The dimensions of the microcavity 100 can range from about 10 μm to about 1 mm (e.g., about 10 μm, about 15 μm, about 20 μm, about 25 μm, about 30 μm, about 35 μm, about 40 μm, about 45 μm, about 50 μm, about 55 μm, about 60 μm, about 65 μm, about 70 μm, about 75 μm, about 80 μm, about 85 μm, about 90 μm, about 95 μm, about 100 μm, about, 120 μm, about 140 μm, about 160 μm, about 180 μm, about 200 μm, about 250 μm, about 300 μm, about 350 μm, about 400 μm, about 450 μm, about 500 μm, about 550 μm, about 600 μm, about 650 μm, about 700 μm, about 750 μm, about 800 μm, about 850 μm, about 900 μm, about 950 μm, and about 1000 μm).

Similarly, the size of the port 112 can range from about 1 μm to about 500 μm, depending on the size of the microcavity 100 (e.g., about 1 μm, about 2 μm, about 3 μm, about 4 μm, about 5 μm, about 6 μm, about 7 μm, about 8 μm, about 9 μm, about 10 μm, about 15 μm, about 20 μm, about 25 μm, about 30 μm, about 35 μm, about 40 μm, about 45 μm, about 50 μm, about 55 μm, about 60 μm, about 65 μm, about 70 μm, about 75 μm, about 80 μm, about 85 μm, about 90 μm, about 95 μm, about 100 μm, about, 120 μm, about 140 μm, about 160 μm, about 180 μm, about 200 μm, about 250 μm, about 300 μm, about 350 μm, about 400 μm, about 450 μm, about 500 μm). The shape of the opening of port 112 (2-dimensional shape) can include circle, oval, triangle, square, rectangle, trapezium, diamond, rhombus, parallelogram, pentagon, hexagon, heptagon, octagon, or any other 2-dimensional shape.

Since the microcavity 100 is disposed in the substrate 110, the port 112 of the microcavity 100 can be disposed just about anywhere on or within the substrate 110, depending on the position of other layers or components. The port 112 extends between an inner surface 114 of the microcavity 100 and an outer surface of the microcavity 100, such as the top surface, the side-wall, or even the bottom surface (if accessible) of the microcavity 100. The port 112 can be positioned at the center or off-centered on any of the surfaces 114. The port 112 can extend perpendicular to the inner surface 114 or possibly be tilted with respect to inner surface 114. If the microcavity 100 includes an optional second port, it can be also located and positioned as described above.

Figure 1B:
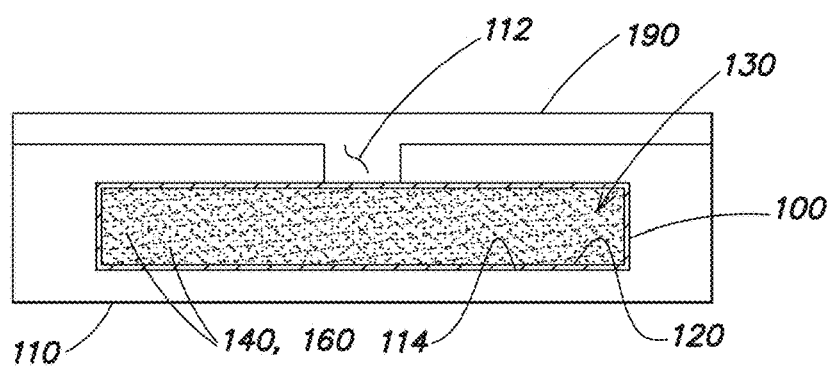
FIG. 1B is an illustration of the microcavity of FIG. 1A filled with a mixture of materials in preparation for photoaligning a liquid crystal material.
Figure 1C:
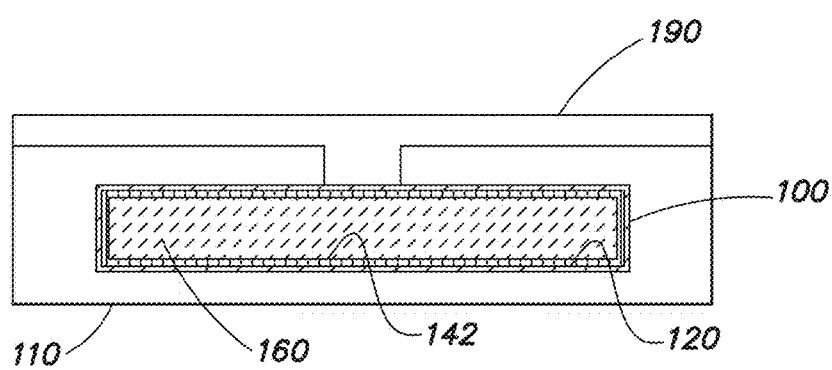
FIG. 1C is an illustration of the liquid crystal microcavity of FIGS. 1A and 1B with photoalignment in place.

A microcavity can be etched in a substrate (e.g., silicon, fused silica, etc.) as follows. A first dielectric material (e.g. silicon dioxide, silicon nitride, etc.) is deposited on the substrate to form a layer that is about 50 nm to 300 nm thick. Next, a sacrificial layer (e.g., molybdenum) with a thickness of 0.5 to 3 microns is deposited on the dielectric layer. A second dielectric layer (e.g. silicon dioxide, silicon nitride) with a thickness of about 50 nm to 300 nm is deposited on the sacrificial layer. A fill hole (e.g., 0.5 to 2 microns square) or array of fill holes is defined photolithographically in the second dielectric layer. The second dielectric layer is etched (e.g., with a dry etch), and the molybdenum sacrificial layer is removed via the fill hole(s), e.g., with hydrogen peroxide etch, to form one or more cavities. Then the cavity or cavities have the azo-dye layer applied and aligned, and then are filled with the RM/LC mixture as detailed below Microcavity Filled with Liquid Crystal and Photoalignment Materials FIGS. 1B and 1C show the microcavity 100 in two different stages of a process for creating a photo-alignment layer for liquid crystal materials in the microcavity 100. The first stage of the alignment as shown in FIG. 1B is the microcavity 100 filled with a mixture 130 of reactive mesogen 140 and liquid crystal material 160. At this stage, the inner surface 114 is at least partially coated with an azo dye layer 120 and photoaligned prior to the introducing of the mixture 130 into the microcavity 100. The single entry/exit port 112 is shown capped with a capping layer 190, which may be formed by spinning on CYTP (perofluoropolymer) or defined through photolithography.

The Azo dye layer 120 includes oblong azo dye molecules aligned in a particular direction (e.g., into and out of the page). Suitable materials for the azo dye layer 120 include, but are not limited to Brilliant Yellow. Without being restrictive, sulphonic azo dyes are particularly suited for this type of photoalignment. Other suitable dyes include SD1 and Chrysophenine.

The Azo dye layer 120 was first photoaligned and the thickness obtained after alignment ranges from about 1 nm to about 10 nm (e.g., about 1 nm, about 2 nm, about 3 nm, about 4 nm, about 5 nm, about 6 nm, about 7 nm, about 8 nm, about 9 nm, or about 10 nm).

Likewise, the reactive mesogen 140 can be any reactive mesogen, including but not limited to RM257, RM84, etc. Similarly, the liquid crystal 160 used in this experiment is an exemplary material and it can be any other liquid crystal material including, but not limited to liquid crystal materials for which the RM is sufficiently insoluble so as to separate at the substrate surface (e.g., when not applying a voltage). In this stage, the RM 140 and the LC 160 are mixed to form the mixture 130, then infiltrated into the entire microcavity 100. The capping layer 190 can include, but is not limited to cytop, silicon dioxide, etc.

The second stage of the photoalignment process as shown in FIG. 1C is the microcavity 100 filled with the materials shown in FIG. 1B. In FIG. 1C, however, the RM 140 has been "photo-processed" to achieve the desired materials properties after certain processes, and the details of these fabrication processes will be further described in the following section. More specifically, in the process stage as shown in FIG. 1C, the RM 140 has been separated to localize near the interface of the Azo dye layer 120 and polymerized to form a polymerized RM layer 142, which is aligned to the azo dye layer 120. The thickness of the polymerized RM layer 142 can range from about 1 nm to about 100 nm (e.g., about 1 nm, about 2 nm, about 3 nm, about 4 nm, about 5 nm, about 6 nm, about 7 nm, about 8 nm, about 9 nm, about 10 nm, about 15 nm, about 20 nm, about 25 nm, about 30 nm, about 35 nm, about 40 nm, about 45 nm, about 50 nm, about 55 nm, about 60 nm, about 65 nm, about 70 nm, about 75 nm, about 80 nm, about 85 nm, about 90 nm, about 100 nm,). The remaining LC material 160 now occupies the rest of the microcavity 110 and is aligned to the polymerized RM layer 142.

Figure 1D:
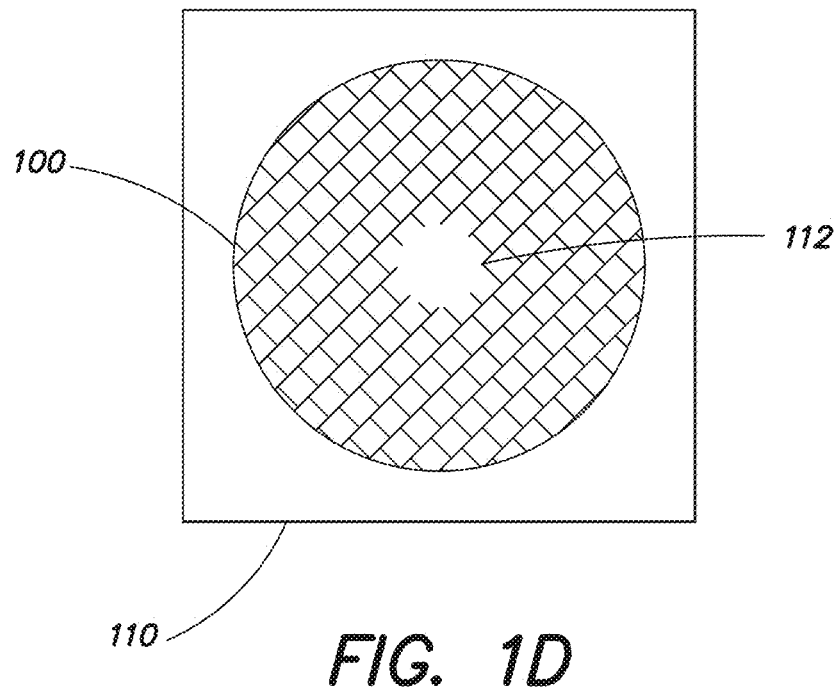
FIG. 1D is a top-view of the microcavity of FIG. 1C.

FIG. 1D is a top view of the microcavity 100, which shows a top view of the entirety of the microcavity 100 disposed inside the substrate 110 with the inner most circle representing the single entry/exit port 112.

Figure 1E:
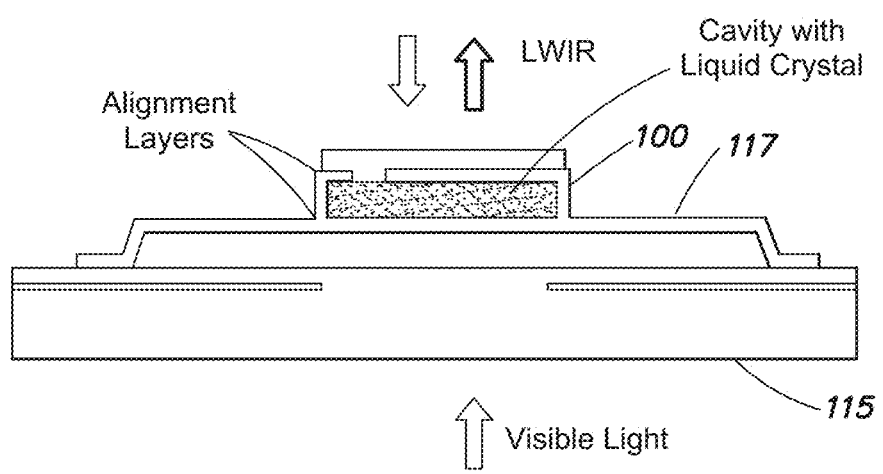
FIG. 1E is an exemplary illustration of a microcavity disposed on an elevated platform filled with liquid crystal and photoaligning materials according to another embodiment.

FIG. 1E is another exemplary embodiment of the microcavity 100 in a different environment. Whereas FIGS. 1A-1D show the microcavity 100 disposed within the substrate 110, FIG. 1E shows an exemplary embodiment in which the micracavity 100 is supported above a substrate 115 by several thermal legs 117. The thermal legs 117 provide thermal and electrical isolation of the microcavity 100 from the substrate 115.

Fabrication Process Flow for RM-Stabilized Photoalignment in Microcavities

Figure 2A:
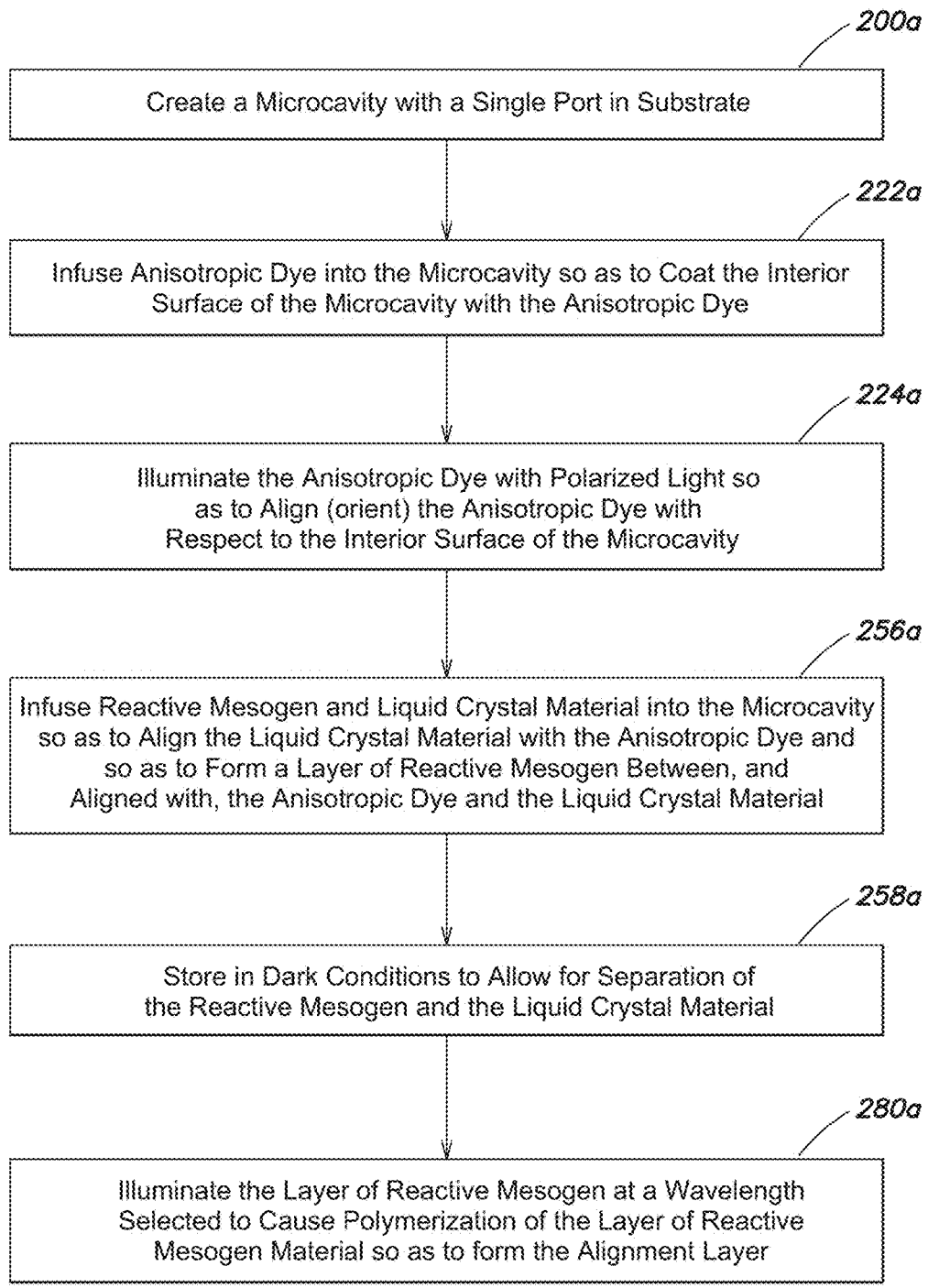
FIG. 2A is an exemplary fabrication process flow diagram for creating a versatile alignment layer in a liquid crystal device via mixing reactive mesogen and liquid crystal prior to infusing into a microcavity.

FIG. 2A shows an exemplary fabrication process flow for using reactive mesogen to stabilize photoalignment in a microcavity. The first step 200a in the fabrication process is the creation of a microcavity with a single entry/exit port. Once the microcavity with a single entry/exit port is obtained, an anisotropic dye, such as an Azo dye, can be infused into the microcavity so as to coat the interior surface of the microcavity with the anisotropic dye in process step 222a. In step 224a, the anisotropic dye is illuminated with linearly or elliptically polarized light so as to align the anisotropic dye with respect to the interior surface of the microcavity. In step 256a, reactive mesogen and liquid crystal materials are infused into the microcavity. In step 258a, the reactive mesogen is allowed to separate from the liquid crystal material. This can be accomplished by storing the microcavity in the dark (to prevent photodegradation of the azo dye layer) until the reactive mesogen has accumulated on the azo dye layer. Step 280a in this fabrication process is to illuminate the layer of reactive mesogen at a wavelength selected to cause polymerization of the layer of reactive mesogen material so as to form a layer of polymerized reactive mesogen between, and aligned with, the anisotropic dye layer and the liquid crystal material. In other words, the polymerized reactive mesogen aligns the liquid crystal material to the anisotropic dye layer.

Figure 2B:
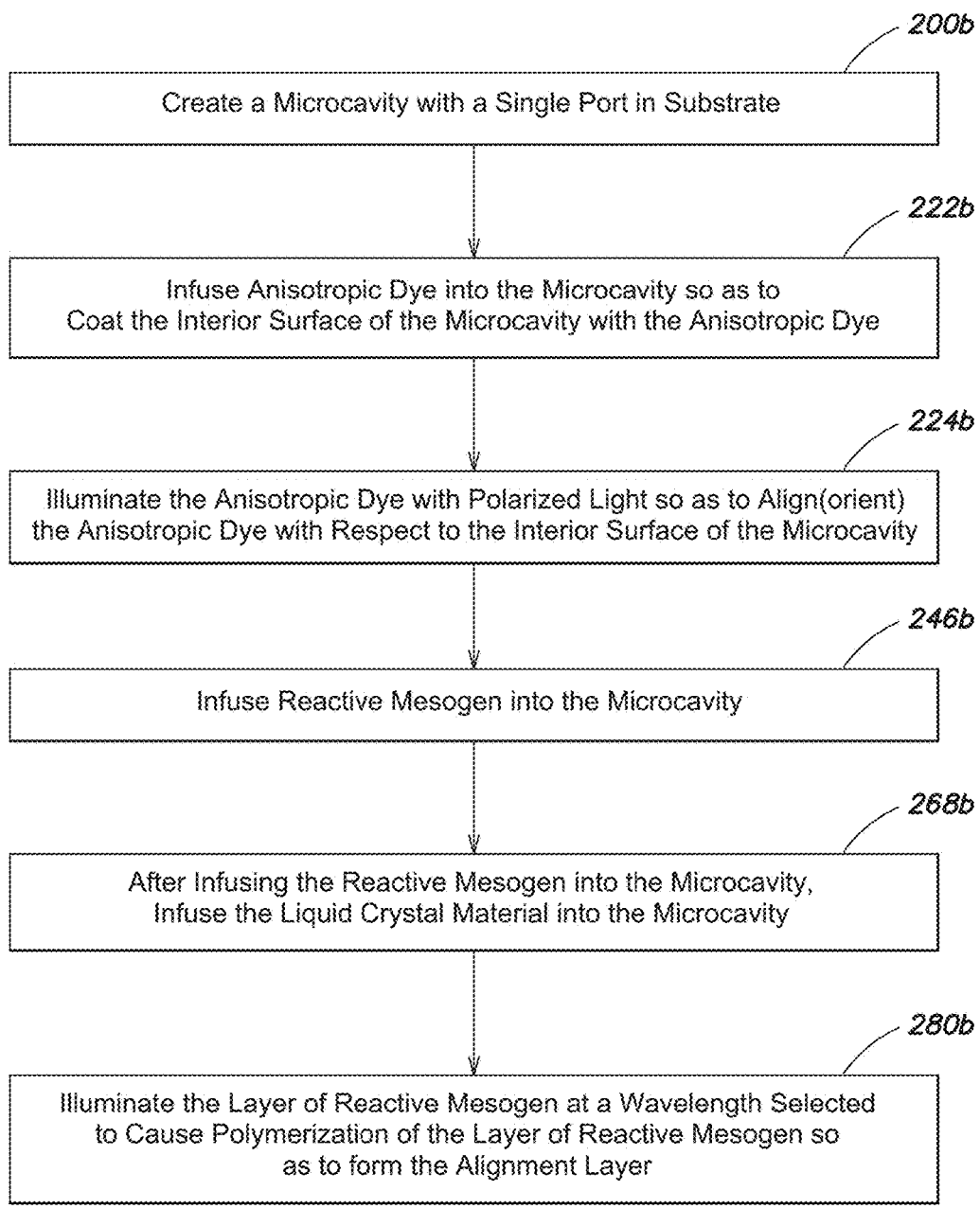
FIG. 2B is an exemplary fabrication process flow diagram for creating a versatile alignment layer in a liquid crystal device via infusing reactive mesogen and then infusing liquid crystal into a microcavity.

FIG. 2B shows another exemplary fabrication process flow for using reactive mesogen to stabilize photoalignment in a microcavity. In this process, the first step 200b also starts with creation of a microcavity with a single entry/exit port. In step 222b, which is similar to step 222a of the process shown in FIG. 2A, once the microcavity with a single entry/exit port is obtained, an anisotropic dye, such as an Azo dye, is infused into the microcavity so as to coat the interior surface of the microcavity with the anisotropic dye. In step 224b, the anisotropic dye is then illuminated with a polarized light so as to form a layer of anisotropic dye aligned with respect to the interior surface of the microcavity. In step 246b, the reactive mesogen is infused into the microcavity. This step is different from step 256a (FIG. 2A) in that it includes infusion of the reactive mesogen without any liquid crystal material whereas step 256a instructs to infuse both the reactive mesogen and the liquid crystal material. Following step 246b is step 268b, which involves infusing liquid crystal material into the microcavity after infusing the reactive mesogen in the step 246b. Note that since infusing reactive mesogen separately into the microcavity allows direct localization of RM onto the underlying anisotropic dye, there is no need to allow the RM to separate from the LC material. After all the materials have been infused into the microcavity, the microcavity is illuminated in step 280b so that the reactive mesogen polymerizes to form an alignment layer that aligns the liquid crystal to the azo dye layer.

Infusing Anisotropic Azo Dye Materials in Confined Microcavities

Figure 2C:
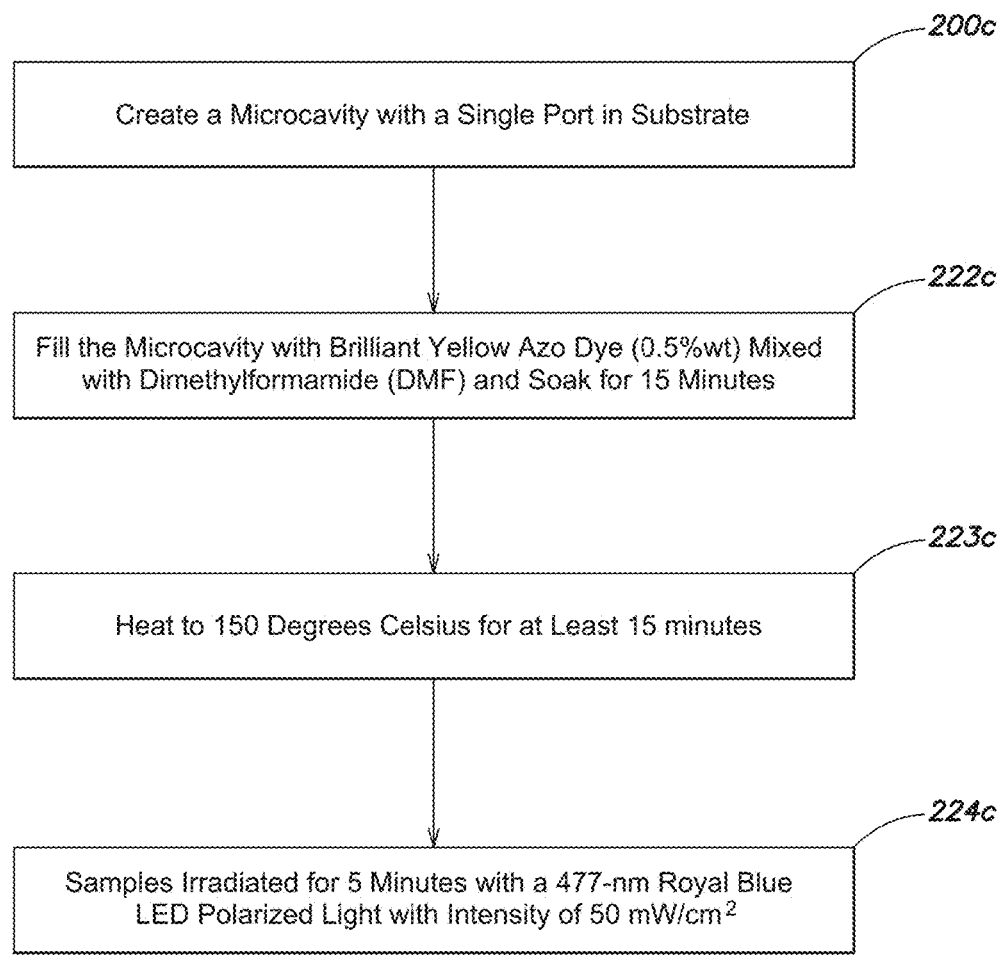
FIG. 2C is an exemplary fabrication process flow diagram for forming an Azo dye layer in a microcavity.

FIG. 2C illustrates a process of creating a stable azo dye photoalignment layer in confined microcavities in greater detail. The first step 200c in the fabrication process is the creation of a microcavity with a single entry/exit port. Brilliant Yellow (BY) dye is mixed into anhydrous N,N-dimethylformamide at 0.5% by weight. For example, the mixture may be vortexed for one minute to create a uniform dye solution. The microcavity is then submerged in this dye solution and allowed to soak, e.g., for 15 minutes (step 222c). Once removed from the dye solution, the top surfaces of the microcavity are cleaned and immediately baked at 150° C. for at least 15 minutes to evaporate solvent out of the microcavity (step 223c), In step 224c, the azo dye is illuminated with blue or UV light (e.g., with a Royal Blue LED with a central wavelength of 447 nm). The intensity of this light at the sample surface may be about 50 mW/cm$^2$ and the irradiation time may be at least 5 minutes.

Figure 2D:
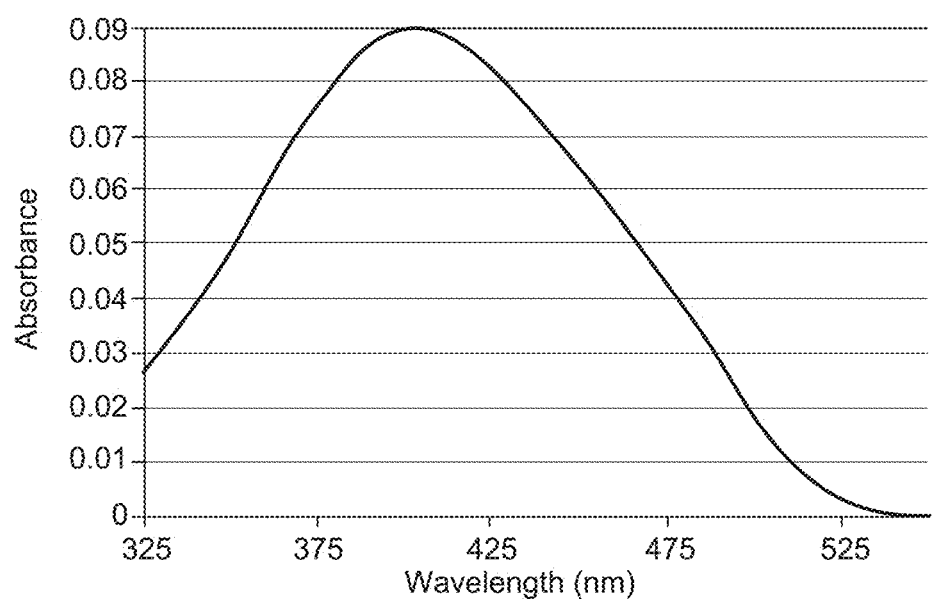
FIG. 2D is a graph of the absorption spectrum of Brilliant Yellow dye.

FIG. 2D is a plot of the absorption spectrum of Brilliant Yellow azo dye. Brilliant Yellow has a somewhat wide absorption spectrum which allows for reorientation utilizing wavelengths ranging from high UV (such as 365 nm) or blue light, as shown in FIG. 2D. As a result, the azo dye absorbs relatively strongly in step 224c of the process shown in FIG. 2C.

One measure of alignment quality is the order parameter of the azo dye layer. The order parameter is determined by using a spectrophotometer to measure the absorption spectra of the dye both parallel and perpendicular to the polarization axis of the irradiating light. The maximum absorbances from these spectra, $A_\parallel$ and $A_\perp$ respectively, are then utilized to calculate the two-dimensional order parameter S2D according to EQN. 1:

$$S_{2D} = \frac{A_\parallel - A_\perp}{A\parallel + A_\perp}. \quad \text{(EQN. 1)}$$

The absolute value of this order parameter represents the degree to which the dye is aligned, with values ranging from 0 to 1.0, with 1.0 representing perfect order and 0 representing complete disorder.

Figure 2E:
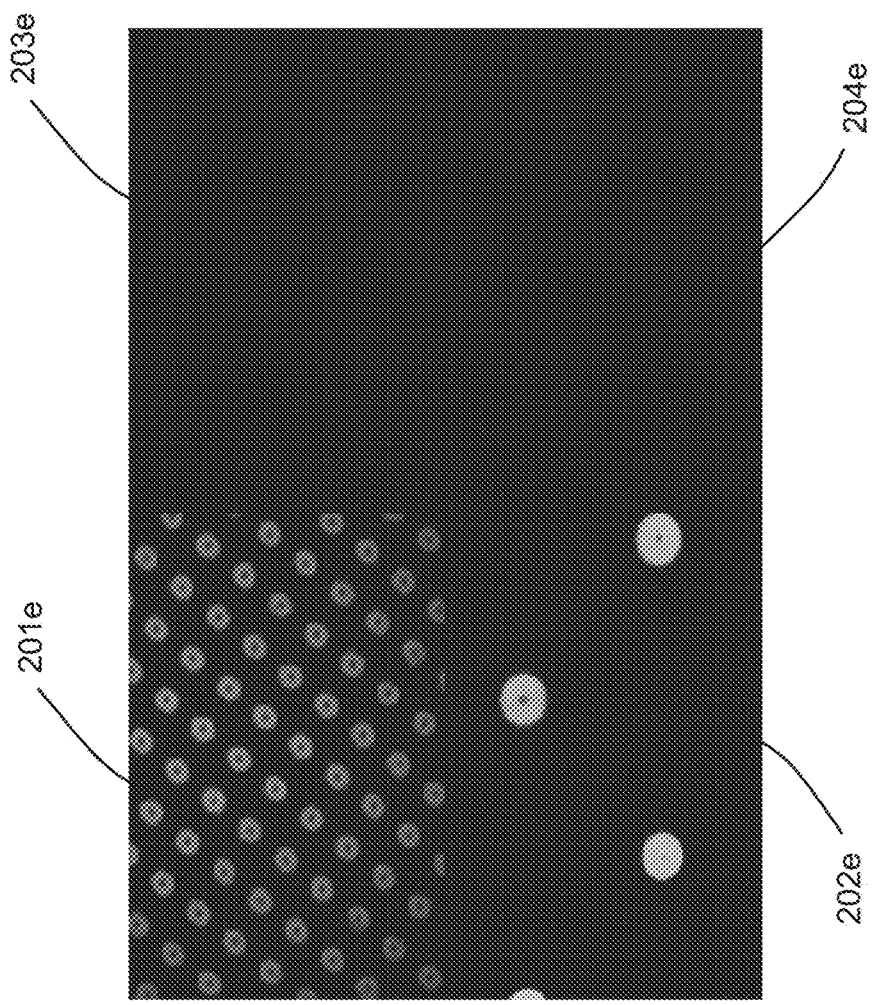
FIG. 2E is a set of images showing the bright and dark states of photoaligned liquid crystal microcavities between crossed polarizers which operate in either reflective or transmissive mode.

It may be difficult or impractical to measure absorption spectra in confined microcavities. However, measuring similar photoalignment layers prepared utilizing 1% wt Brilliant Yellow in dimethylformamide (DMF) applied to glass via spin-coating gives order parameters in the range of 0.8, indicating very strong order of the dye molecules. And liquid crystals vacuum-filled (in the isotropic state) into the microcavities prepared with azo dye layers as shown in FIG. 2C exhibit very strong, uniform dark and bright states, as shown in FIG. 2E, which suggests that the azo dye layers in the cavities also have relatively high order parameters (e.g., about 0.8 or higher). More specifically, FIG. 2E shows bright (201e and 202e) and dark (203e and 204e) states of photoaligned LC microcavities displayed between crossed polarizers which operate in either reflective (201e and 203e) or transmissive (202e and 204e) mode. Cavity diameter is ~12 μm for 201e and 203e (top row), and ~20 μm for 202e and 204e (bottom row). Bright and dark images for each in FIG. 2E are taken with equal exposure.

Infusing Reactive Mesogen in Confined Microcavities

Figure 2F:
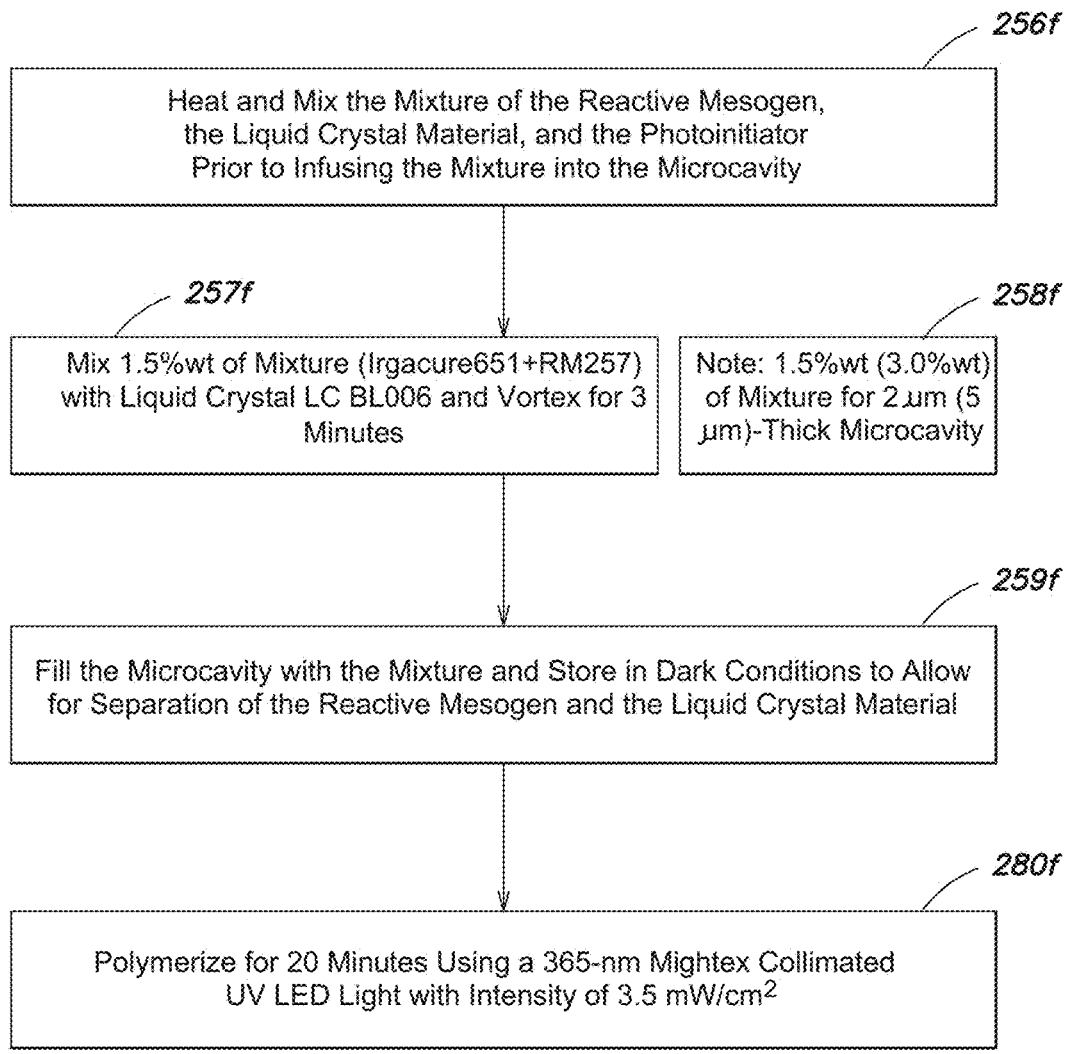
FIG. 2F is an exemplary fabrication process flow diagram for form a reactive mesogen layer within a microcavity.

The fabrication process described in FIG. 2F is an exemplary processing method for infusing reactive mesogen into microcavities. Step 256f of the process begins with creating a mixture of reactive mesogen (e.g., RM257 mixed with 10% wt of photoinitiator, such as Irgacure 651) in liquid crystal BL006. The RM/photoinitiator mixture was either 0.9% wt, 1.2% wt, or 1.5% wt in the LC BL006. In step 257f, this mixture is heated to 125° C., then vortexed for 3 minutes to create a somewhat uniform mixture. Note that a 1.5% wt of mixture can be used for a 2-μm thick microcavity and a 3.0% wt of mixture can be used for a 5-μm thick microcavity (258f). Generally, the percentage of RM should be low enough to avoid undesired light scattering and high enough so as to stabilize the surface. After vortexing, the mixture is infused into the microcavity and allowed to cool. The microcavity is then stored (e.g., in a dark, airtight container overnight) to allow phase separation of the RM to the cell surfaces in step 259f of FIG. 2F. In step 280f, the cells are polymerized by exposure to an unpolarized Mightex high power UV LED source (λ=365 nm) at ~3.5 mW/cm². This results in a polymerized RM layer on the substrate surfaces that is thin enough not to scatter incident light.

Experimental Assessment of Polymerized Reactive Mesogen Layers

Figure 2G:
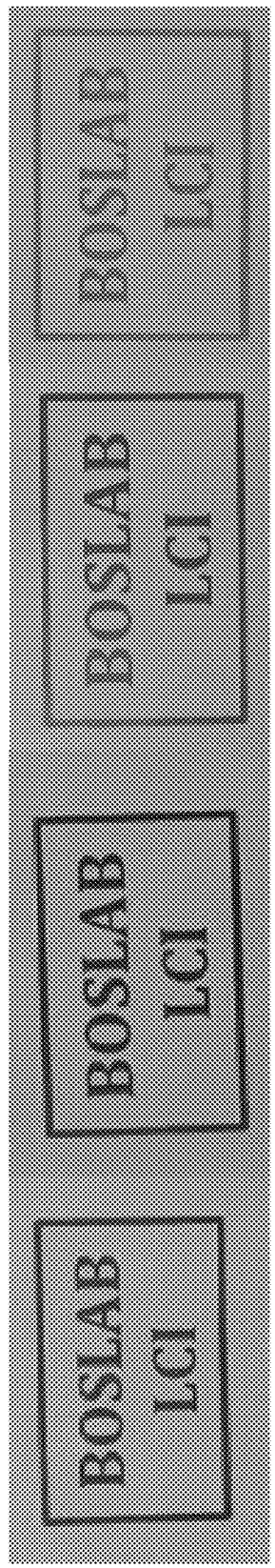
FIG. 2G is a set of images showing the degrees of scattering through planar liquid crystal cells (ii, iii, and iv) with polymer-stabilization layers as compared to a liquid crystal cell without a polymerized layer (i).
Figure 2H:
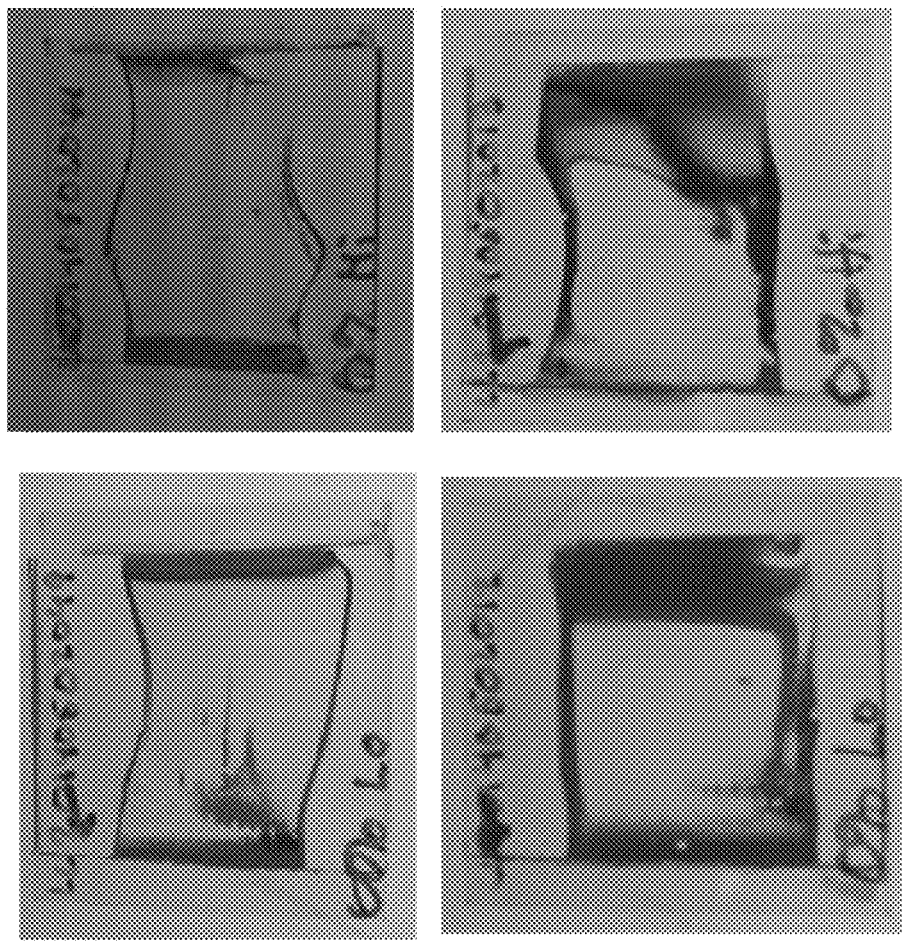
FIG. 2H is a set of images showing the degradation of twisted cells prepared with one photoaligned substrate and one rubbed-polyimide substrate, using pure BL006 (top).

FIG. 2G shows macroscale liquid crystal cells that include polymerized RM layers prepared using the process shown in FIG. 2F. These cells either had a rubbed-polyimide layer on both substrates and were configured in an untwisted planar orientation or had rubbed-polyimide on one substrate and a spun 2% wt Brilliant Yellow photoalignment layer on the other and were configured with a 55-degree twist. This low twist angle is utilized to assure the handedness of the twist was identical in all cells. Planar cells are utilized to observe scattering while twist cells are utilized for stability testing (described below).

The images shown in FIG. 2G were acquired by placing the samples directly in front of a camera viewing text on a screen 2 feet away. A picture through the cell of this screen was taken for each sample and compared to a planar sample filled with pure BL006 liquid crystal material. The degree of scattering in each is characterized as either major, minor, or none.

TABLE 1

Scattering grade for each prepared cell.

| RM Concentration (%) | Scattering? (A/I/N) |
|---|---|
| 0.9 | I |
| 0.9 | N |
| 0.9 | A |
| 1.2 | N |
| 1.2 | I |

TABLE 1-continued

Scattering grade for each prepared cell.

| RM Concentration (%) | Scattering? (A/I/N) |
|---|---|
| 1.2 | A |
| 1.5 | N |
| 1.5 | N |
| 1.5 | N |

Table 1 shows a number of cells prepared and the degree of scattering present, with A=major, I=minor, N=none. The evidence of scattering is mixed in samples prepared with either 0.9% wt or 1.2% wt RM/LC solution, but there is no scattering in cells prepared with 1.5% wt RM/LC solution.

Stability testing of the twisted cells prepared with one substrate coated with a rubbed polyimide alignment layer and the other with a spun-on Brilliant Yellow (BY) photoalignment layer was performed. The BY was applied by mixing the dye at 2.0% wt in DMF, then vortexing for 30 seconds to create a uniform solution. The glass was cleaned via ultrasonic and UV/$O_3$ cleaning just prior to application of the dye solution, which was passed through a 1 μm filter as it was applied. The entire substrate was coated and the sample spun at 1500 rpm for 30 s to create an even dye layer coating. The substrate was then baked at 120 C for 40 minutes to evaporate any remaining solvent. These substrates were then exposed to polarized blue light at ~50 mW/cm² for 7 minutes using the same exposure setup used to expose the microcavity samples.

Samples were then assembled in twisted configuration at 55 degrees and filled with BL006 liquid crystal which was either pure or mixed with RM257 and a photoinitiator then polymerized as described above.

For photostability testing, samples were exposed to the same blue LED setup ($\lambda_{max}$=447 nm) used to align them, except they were now irradiated with unpolarized light at either 3 mW/cm² or 15 mW/cm² (10 mW/cm² for pure BL006 samples). Samples containing pure BL006 were exposed for a total of 24 hours while samples containing a polymer-stabilization layer were exposed for a total of 48 hours. Table 2 shows the total irradiation dose for each of these exposure conditions.

TABLE 2

Total irradiation dose for the various exposure conditions used for photostability trials.

| Type | Intensity (mW/cm²) | Time (hr) | Dose (J/cm²) |
|---|---|---|---|
| Pure BL006 | 3 | 24 | 259.2 |
| Pure BL006 | 10 | 24 | 864 |
| RM/BL006 | 3 | 48 | 518.4 |
| RM/BL006 | 15 | 48 | 2592 |

The twisted cell configuration was utilized to provide fast visual determination of the degradation of photoalignment layers. When the cell was initially fabricated, the anchoring energies of the rubbed-polyimide and of the photoalignment layer were similar, so the twisted configuration was as designed. As the photoalignment layer degraded, rubbed-polyimide alignment direction dominated in the cell and the alignment became planar instead of twisted.

Samples containing pure BL006 showed complete degradation after the 24-hour exposure period; the cells when viewed between parallel polarizers exhibit a planar rather than twisted alignment, as shown in FIG. 21I; this is regardless of the intensity of the irradiation.

Figure 21:
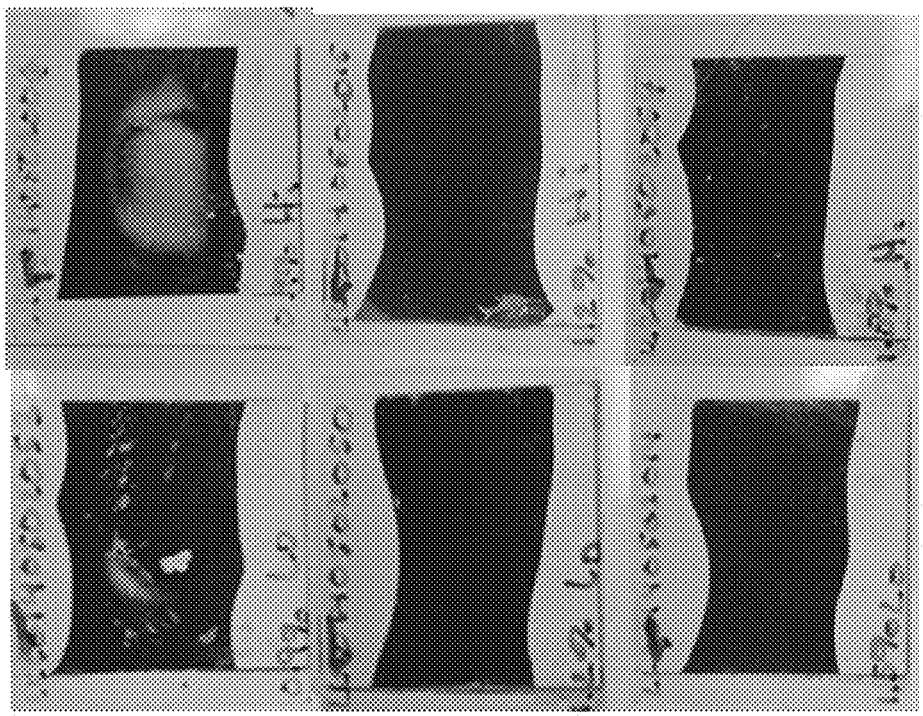

A total of 46 samples across all RM concentrations were tested. FIG. 21 shows a representative selection of these samples after 48 hours of exposure to either 3 mW/cm² or 15 mW/cm² (shown between parallel polarizers). The cells prepared with 0.9% wt RM showed degradation after 48 hours, though it is a significant improvement from the pure BL006 liquid crystals samples. All samples prepared using either 1.2% wt or 1.5% wt RM solution remain in a highly uniform twisted configuration; the polymer layers in these samples are sufficient to offer strong stabilization of the alignment against subsequent photoexposure. The twist angles of all samples were measured after this photoexposure; all cells which remained in a twisted configuration showed no loss of twist angle, within experimental error.

For thermal stability testing, similar twist cells were utilized with rubbed-polyimide on one substrate and BY photoalignment on the other, prepared alongside the photostability twist samples. These samples were filled with pure BL006. The samples were then baked in a vacuum oven at 100° C. for a total of 2 weeks (about 340 hours). No visible degradation in alignment or loss in twist angle was observed in these cells after this baking. The thermal stability of the photoalignment layer on its own is sufficiently strong.

III. Surface Localization of Reactive Mesogen

Illustrating Surface-Localization

To illustrate surface localization of reactive mesogen, bulk cells (on the order of inches) were fabricated with reactive mesogen (RM84) and measured to estimate the conditions for creating a thin and stable alignment layer in microcavities. Confocal microscope images were taken using 0.08% weight concentration of Fluorescein Dimethacrylate, a dye which selectively associates with the RM in the test cells (the wavelength used was 460 nm, which is well absorbed by the dye). This method was used to assess the effect of mixing on the diffusion of RM to the cell surfaces.

Figure 3A:
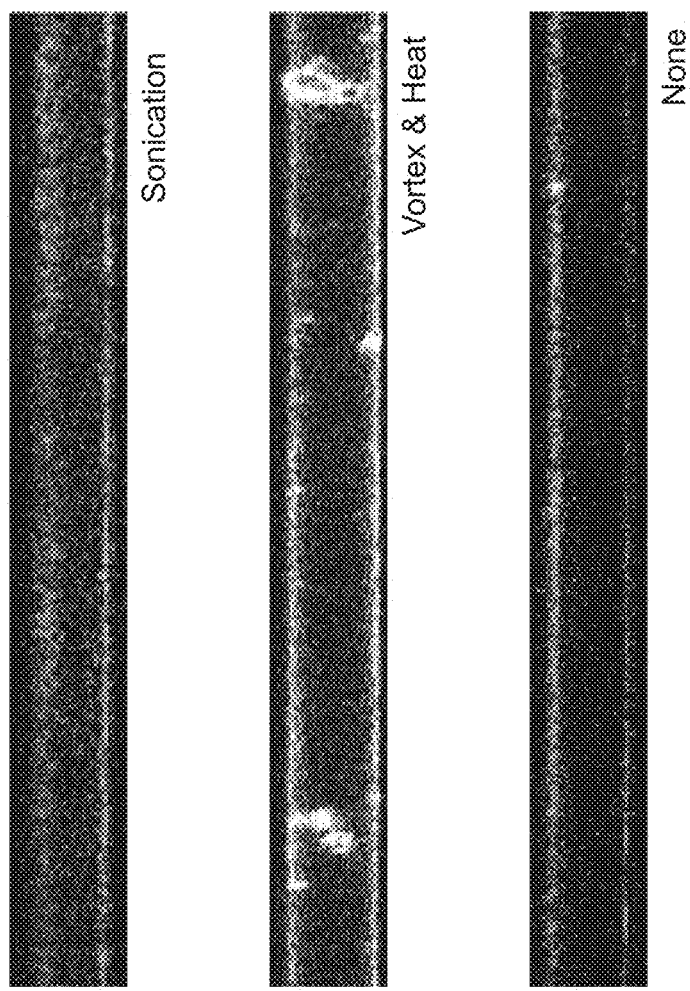
FIG. 3A shows a set of confocal micrographs of monomers' distribution along the cell gap direction under different mixing conditions: Sonication, Vortex and Heat, and None.

FIG. 3A shows confocal images of the bulk cells fabricated with RM monomers and their distribution and concentration of the dye (and therefore, the RM) along the cell gap direction under different mixing conditions. For all of the images, the bright areas represent the more concentrated areas of dye. The top image shows the monomer distribution only using sonication. The middle image shows the distribution of monomers after vortexing and heating, and the bottom image shows the distribution of monomers without using any particular mixing approach.

FIGS. 3B-I, 3B-II, and 3B-III show plots of the intensity variation along a vertical cross-section of each image in FIG. 3A, indicating the distribution and concentration of the dye in the LC cell show that, for very weak mixing, RM diffuses out of the LC and is localized at the surface rather symmetrically. However, both sonication and no mixing resulted in non-symmetric distribution of RM to the substrates surfaces (worst in the case of no mixing) and a lower surface concentration of RM overall (reduction in the maximum measured dye intensity near the surfaces). Through control of mixing of the RM into the LC, the RM layer is concentrated on the surface to provide stabilization of the photodefinable layer.

Simulated Surface-Localization

Simulated studies show that the polymer network density gradient normal to the plane of the cell can affect the surface-localized polymer layer, and thus affect photoalignment. The LC director configuration in the cell, given a particular applied voltage, was determined numerically by utilizing the free energy density of the system, given by EQN. 2, $$f_d = \frac{k_{11}}{2}(\nabla \cdot \hat{n})^2 + \frac{k_{22}}{2}(\hat{n} \cdot \nabla \times \hat{n})^2 + \frac{k_{33}}{2}(\hat{n} \times \nabla \times \hat{n})^2 - \frac{W}{2}(\hat{n} \cdot \hat{n}_o)^2 - \frac{1}{2}(D \cdot E)^2, \quad \text{(EQN. 2)}$$

where $k_{11}$, $k_{22}$, and $k_{33}$ are the splay, twist, and bend elastic constants of the LC, respectively, D is the electric displacement, E is the electric field, n is the LC director at a particular point, $n_o$ is the preferred direction of the director (at points along the polymer network), and W is the effective anchoring strength of the LC director in contact with the polymer (W=0 in regions without polymer). The preferred director, $n_o$, is determined by the director orientation at the time of polymerization, where the orientation is imprinted onto the polymer network, illustrated in FIGS. 4A-4D and explained below. If the sample is polymerized (e.g., by exposure to UV light) with no applied voltage, then the polymer network will lock in a planar orientation. However, if a voltage is applied during the polymerization process, then the tilted director configuration will be locked in, even after the voltage has been turned off The effect of the polymer distribution through the cell was modeled by making the anchoring parameter, W, effectively proportional to a polymer distribution given by EQN. 3, $$X(z) = X_0(e^{-z/\xi} + e^{-(d-z)/\xi}), \quad \text{(EQN. 3)}$$

where $X_0$ is considered as the polymer concentration at the substrate surface, d is the cell thickness, and $\xi$ is the length scale for the decay of the concentration going away from the surface.

FIG. 4A shows a microcavity 400 within the substrate 410 filled with photoaligned azo dye (not shown) and a mixture 430 of RM 440 and LC 460. As shown in FIG. 4A, a thin layer of RM 440 has localized closer to the inner surfaces 414 of the microcavity 400, leaving the LC 460 in the bulk of the microcavity 400.

FIG. 4B shows the microcavity 400 under an applied electric field 470. In this stage, the LC 460 molecules in the bulk (center) portion of the microcavity 400 align with the applied polarizing electric field 470, although the orientation of the LC 460 molecules close to or intermixed with the RM 440 concentrated near the inner surfaces 414 may remain unchanged. The RM 440 (and possibly some LC 460) closer to the inner surfaces 414 remains aligned with the photoaligned azo dye (not shown).

FIG. 4C shows the microcavity 400 under UV illumination 480. In this stage, the UV illumination 480 causes the RM 440 molecules polymerize, forming a polymerized RM layer 442 that locks-in the orientation of the LC 460 molecules intermixed within its network.

FIG. 4D shows the microcavity 400 after the applied electric field 470 and UV illumination 480 are removed. It shows microcavity 400 with LC 460 aligned to the polymerized RM layer 442.

Figure 5A:
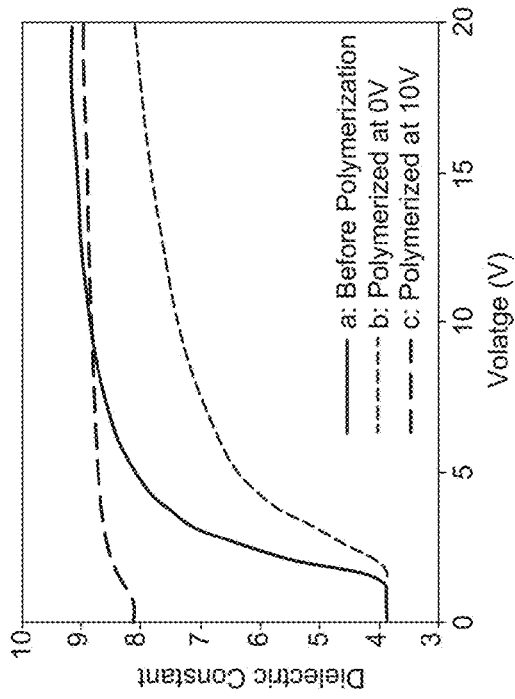
FIG. 5A shows simulated dielectric data using surface concentration $X_0=0.08$ and decay length $\xi=0.2$ d and indicating that the polymer network is evenly distributed throughout the cell.
Figure 5B:
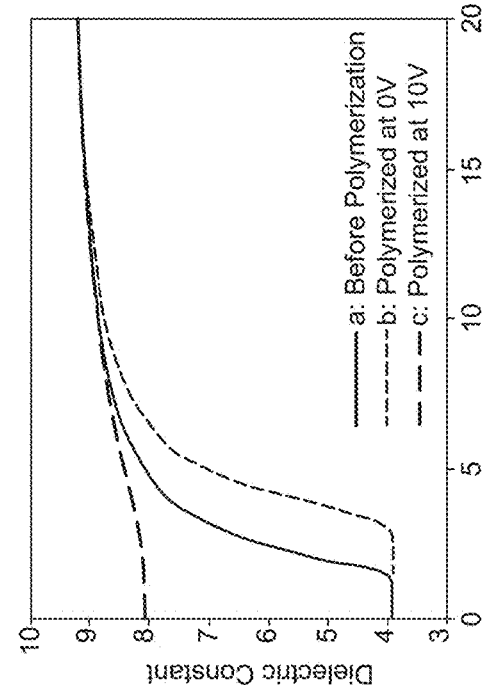
FIG. 5B shows simulated dielectric data using surface concentration $X_0=0.8$ and decay length $\xi=0.02$ d and indicating that the polymer is more concentrated near the surface inside the cell.
Figure 5C:
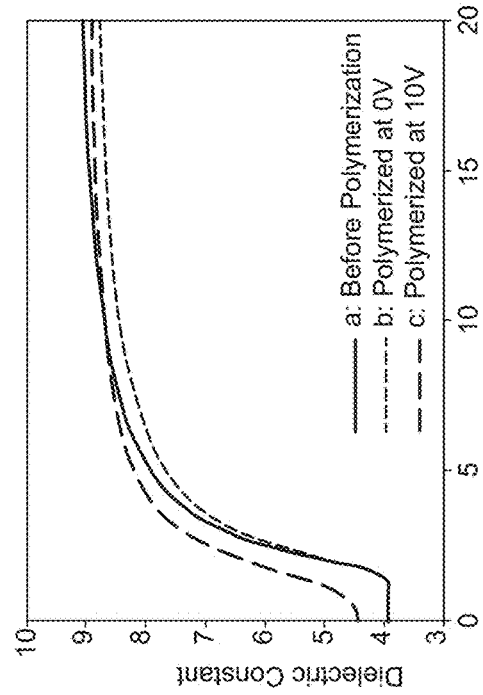
FIG. 5C shows simulated dielectric data in which the polymer network is assumed to be infinitesimally thin (i.e., highly localized), indicating its suitability as an alignment layer.

FIGS. 5A-5C show simulated dielectric data versus voltage for different surface concentrations and decay lengths. In FIG. 5A, at a surface concentration of $X_0$=0.08 and decay length of $\xi$=0.2 d, the plot indicates that the polymer network is evenly distributed throughout the cell. On the other hand, FIG. 5B shows that for a surface concentration $X_0$=0.8 and decay length $\xi$=0.02 d, the polymer is more concentrated closer to the surface inside the cell. These plots show the effect of the values of $X_0$ and where the polymer orientation, also equal to $n_o$, is determined by the director distribution in the cell with 10 V RMS applied. Note that these plots show dielectric constant versus voltage—the dielectric constant was calculated directly based on the simulated director configuration. It can be seen that, if the polymer is quite evenly distributed through the cell, the main effect is to see a shift in the threshold voltage of the device (the voltage below which no change in dielectric constant has occurred). However, if the polymer is more concentrated on the surface, one effect is a shift in the saturation voltage of the device (the voltage above which the change in dielectric constant has saturated).

On the other hand, when a simplified model was used, it was assumed that the effect of the polymer was restricted to an infinitesimally thin layer (effectively a monolayer). This thin layer at the surface that acts as an alignment layer with a pretilt (no polymer network exists in the liquid-crystal-filled region of the cell and the polymer interaction term is dropped), the effect on the dielectric constant vs. voltage curve is simulated as shown in FIG. 5C. Here, there is little effect on the curve where the polymer is cured at 0 V. One effect is to lower the zero-volt value of the capacitance for the case where the cell is cured at high voltage. The zero-volt value of the capacitance will be related to the induced pretilt that results from the given value of the applied voltage, with higher voltages and/or higher polymer concentrations yielding values of the zero volt capacitance that are higher, approaching the saturation value with the effective pretilt of 90 degrees.

Measured Surface-Localization

Transmission vs. voltage (TV) curves on cells prepared similarly to the referenced simulations discussed in the previous section are utilized in the measurements. Phase vs. voltage for each sample shows similar behavior to the dielectric constant vs. voltage curves; a change in the zero volt phase indicates an increase in the pretilt of the sample while a change in the threshold voltage indicates that the polymer network is not surface localized and exists in the bulk.

Figure 6:
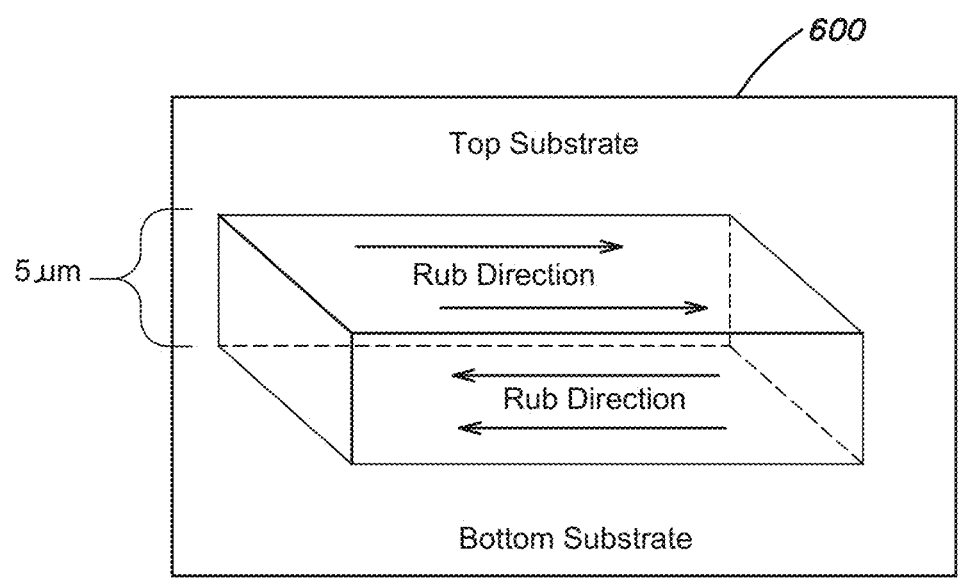
FIG. 6 shows a diagram of a microcavity prepared for testing surface localization of reactive mesogen. Polyimide alignment layers on each substrate were rubbed in opposite directions (as indicated).

FIG. 6 shows a liquid crystal cell 600 used to measure the surface localization of the polymerized RM. For the experiments, 5 μm thick cells with at least a 1 cm×1 cm active area were prepared with rubbed polyimide alignment layers on the substrate surfaces (each substrate was rubbed in the opposite direction). Before infiltrating the cells, RM257 was mixed with a photoinitiator Irgacure 651 in which the photoinitiator was at 10% concentration by weight. This was then added to the LC BL006 such that the RM257/photoinitiator was at 1.5% concentration by weight. This mixture was then heated to 125° C. and vortexed for 3 minutes to produce a uniform mixture. Cells were then infused with either the 1.5% wt RM257/BL006 mixture or pure BL006. The RM/LC cells were then stored overnight in dark conditions to allow for separation of the RM to the substrate surfaces. Next, these samples were polymerized using 20 minutes of exposure to about 3.5 mW/cm² UV light (λ=365 nm) provided by a Mightex collimated UV LED light source. The cell was either polymerized at 0V or 20V (1 kHz AC).

Once cells were polymerized, TV curves were obtained by placing the sample between two polarizers. TV curves were taken with both crossed and parallel polarizers; in both cases, the cell was oriented with the alignment at 45 degrees to the input polarizer. A broadband Oriel fiber optic illuminator was used as a light source and an interference filter (λ=633 nm) was utilized to produce monochromatic light.

To neglect transmission losses for phase calculations, the TV curve was adjusted so that the maximum and minimum transmission through the cell (i.e., detected voltage) were taken to be equivalent to a transmission of 1 or 0, respectively.

To produce a plot more comparable to the CV curves, each set of TV curves was further converted into a phase retardation vs. voltage profile. This utilizes the fact that the transmitted intensity between crossed polarizers is given by EQN. 4, $$I_\perp = I_o \left(\sin\frac{\delta}{2}\right)^2, \quad \text{(EQN. 4)}$$

with δ being the phase retardation of the LC sample. This transmitted intensity between parallel polarizers is similarly given by EQN. 5, $$I_\| = I_o \left(\cos\frac{\delta}{2}\right)^2. \quad \text{(EQN. 5)}$$

The phase retardation of the sample at a particular voltage, then, is given by the transmission ratio in these two plots, as $$|\delta| = N\pi 2 \tan^{-1}\sqrt{I_\perp/I_\|}, N=0,2,4,\ldots, \quad \text{(EQN. 6)}$$

or $$|\delta| = (N+1)\pi - 2 \tan^{-1}\sqrt{I_\perp/I_\|}, N=1,3,5,\ldots, \quad \text{(EQN. 7)}$$

where N is the peak number in the TV curve (counted up from the high-voltage end of the curve). When the cell is almost completely switched, N=0.

Figure 7:
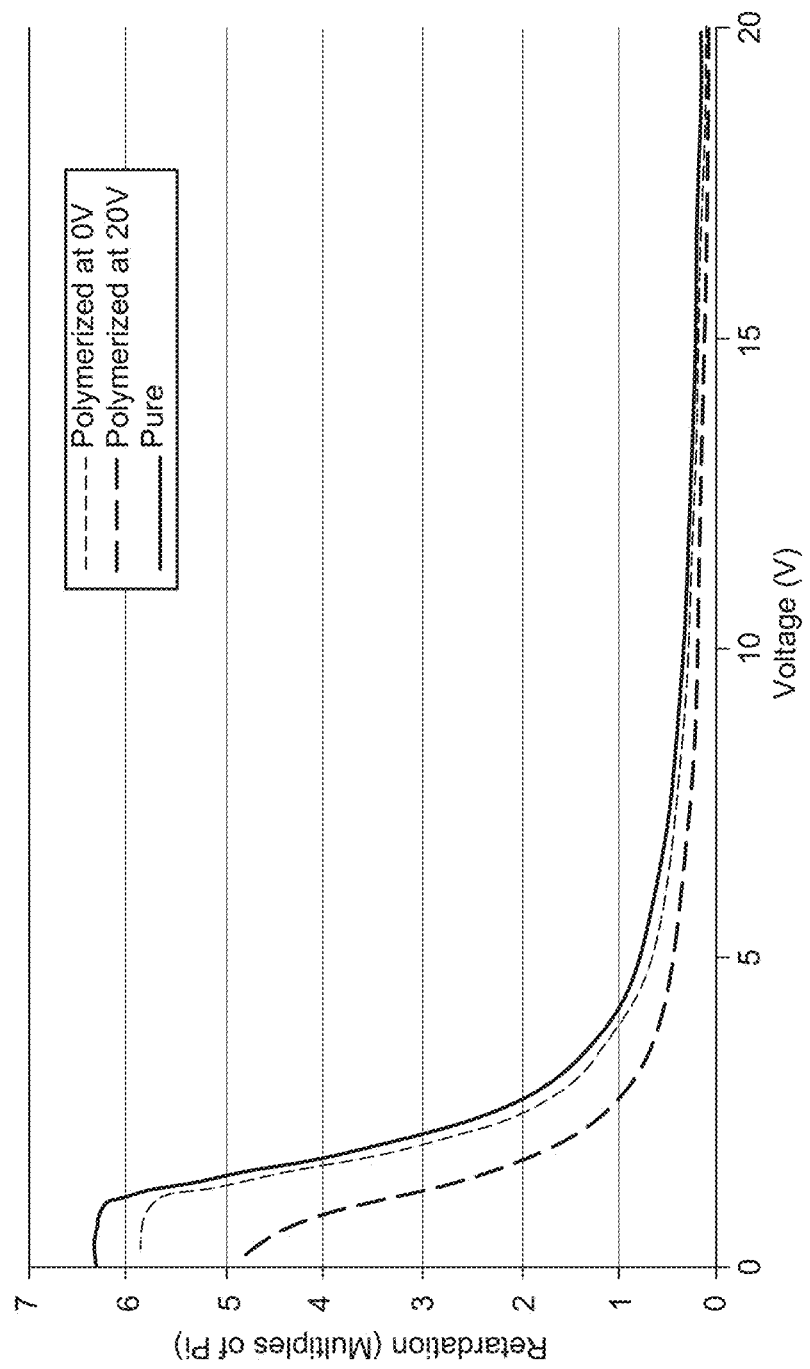
FIG. 7 shows phase profiles for 5 µm planar cells filled with pure liquid crystal (LC) or LC with 1.5% wt RM257, which was polymerized at either 0V or 20V.

FIG. 7 shows the phase retardation vs. voltage for the prepared cells. In this case, the sample polymerized at 0 V shows no significant differences from the cell filled with pure LC—neither the threshold voltage nor the saturation voltage is noticeably different. This indicates that the RM layer is sufficiently thin, e.g., on the order of several hundred nanometers or less, so as to have no effect on the bulk LC. In the case of the sample polymerized at 20 V, though, the zero volt retardation has dropped and the threshold voltage has also decreased, indicating that the pretilt of the cell has increased. These results are very similar to the case of an infinitesimally thin RM layer, shown in FIG. 5C, indicating that the RM layer is quite thin.

IV. Photostability Testing

To test the ability of the polymer layer to stabilize the alignment generated using a photoalignment layer, additional 7 μm cells were constructed in which one substrate was coated with a rubbed polyimide alignment layer and the other was coated with a spun-on BY photoalignment layer. The BY was applied to the glass by mixing the dye at 2% concentration by weight into DMF, then vortexing for 1 minute to create a uniform solution. The glass was cleaned via ultrasonic and UV/O3 cleaning just prior to the application of the dye solution, which was passed through a 1 μm filter as it was applied. The entire substrate was coated and the sample was spun at 1500 rpm for 30 seconds to create an even dye layer coating. The substrate was then baked for 120° C. for 40 minutes to evaporate any remaining solvent.

Test samples, once assembled, were exposed to about 50 mW/cm² polarized blue light for 7 minutes using the same exposure setup described above for microcavities. This exposure was incident on the back of the photoaligned substrate and with the polarization direction aligned with the rubbed polyimide alignment direction. This exposure results in an approximately 90-degree twist with the photoalignment direction perpendicular to the rubbed alignment.

This twisted cell configuration provides for fast visual determination of the degradation of alignment. When the cell is initially fabricated, the anchoring energies of the rubbed-polyimide and of the photoalignment layer are both sufficiently strong, so the twisted LC director configuration is observed. If the photoalignment layer is rewritten to a new angle, then the twist angle through the cell will change. If the photoalignment layer is degraded, the rubbed polyimide alignment direction will dominate and the cell will lose its twisted director configuration completely. The director field in the cell will then be co-planar and aligned with the axis determined by the polyimide. When viewed between crossed polarizers, twisted regions will appear bright while non-twisted planar regions will appear dark. When viewed between parallel polarizers, non-twisted planar regions will appear bright while twisted regions will appear dark.

The samples were filled with either pure BL006 liquid crystal or the same 1.5% wt RM257/BL006 mixture as described above, with storage and polymerization at 0V occurring as previously described. For photostability testing, samples were exposed to the same blue LED used to align them. In one case, samples were exposed to 20 mW/cm$^2$ polarized light at 45 degrees to the original photoexposure direction; this approximates the highest level of illumination expected on the thermal pixels. In another case, samples were exposed to unpolarized light of 120 mW/cm$^2$. In this case, unpolarized light was used so as to simulate flux five times higher than utilized in the thermal pixel application.

FIG. 8A shows that samples containing pure BL006 liquid crystal showed a complete loss of their original photoalignment direction in the low intensity polarized exposure. As shown in FIG. 8A, samples are filled with pure BL006 (a) before exposure or after (b) 50 minutes, (c) 100 minutes, (d) 150 minutes, and (e) 200 minutes of exposure to about 20 mW/cm$^2$ polarized blue light oriented at 45 degrees to the photoalignment axis. Before images are shown between crossed (left) and parallel (right) polarizers. After images are shown between parallel (left) and crossed (center) polarizers as well as polarizers oriented at 45 degrees (right). For all samples, the alignment was rewritten within the first 50 minutes of exposure. Between polarizers oriented at 45 degrees (the newly written twist angle of the cell), the sample exhibits a somewhat dark twist state. However, as the sample is exposed for longer, even this alignment is lost, with the sample failing to twist light at all. The photoalignment layer has been completely degraded and the intended alignment of the sample has been lost.

Samples with pure BL006 liquid crystal also showed a rapid degradation of their photoalignment layer in the high intensity unpolarized case. These samples exhibited planar alignment after less than 20 minutes of exposure to this condition. On the other hand, samples which contained the RM-stabilization layer exhibited a high degree of stability. In both the low intensity polarized condition and the high intensity unpolarized condition, samples maintained their 90-degree twisted alignment for 3 weeks with no sign of degradation in their alignment, as shown in FIG. 8B.

Figure 9:
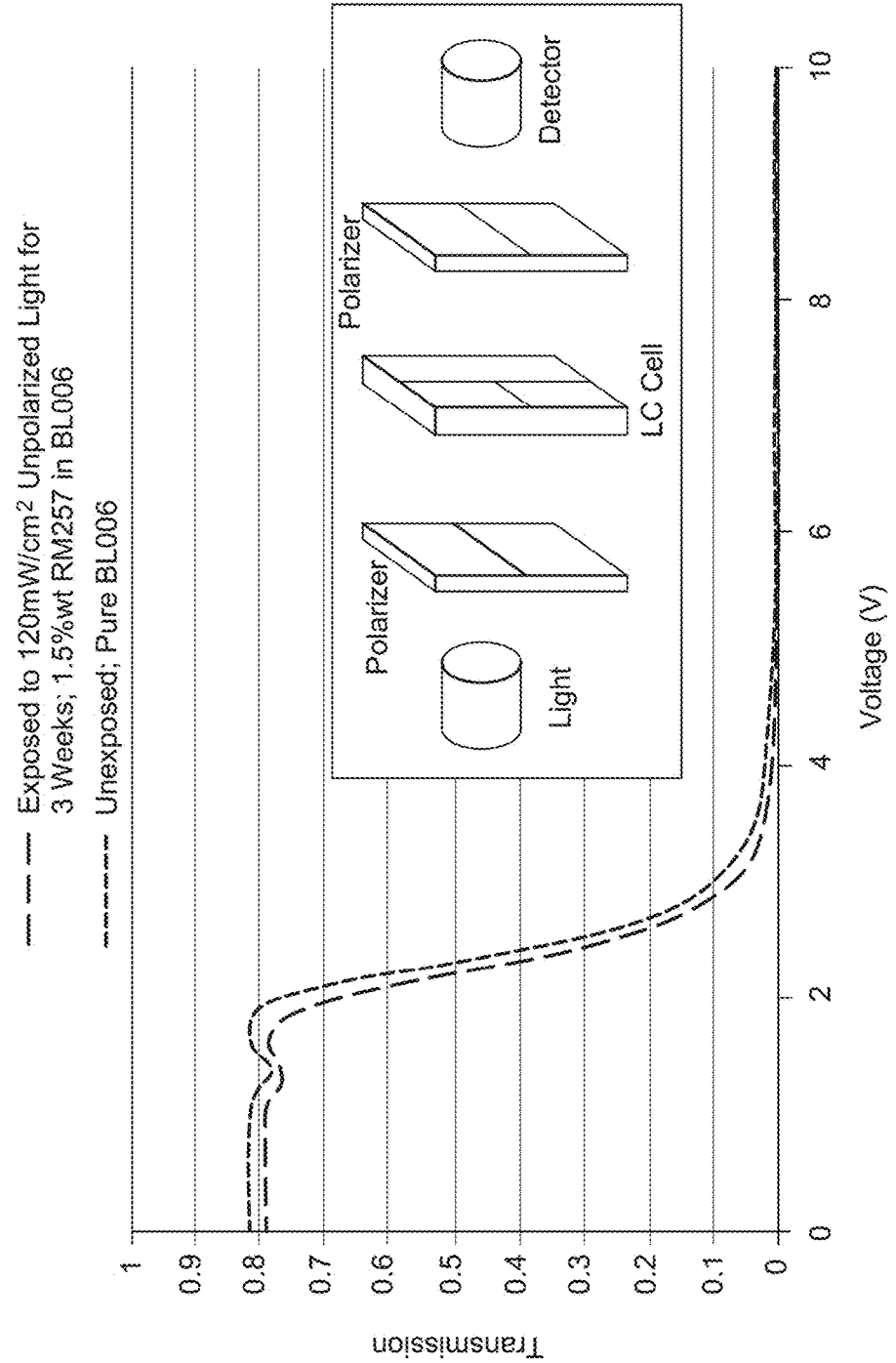
FIG. 9 shows transmission v. voltage (TV) curves of 5 µm samples with rubbed polyimide alignment on one substrate and BY photoalignment on the other substrate, aligned in a 90-degree twisted configuration.

The electro-optic response of these samples was also considered. In this case, a sample filled with pure BL006 which had not been exposed, as well as the sample filled with 1.5% wt RM257 in BL006 which had been exposed to about 120 mW/cm$^2$ unpolarized light for 3 weeks, were utilized. Samples were placed between crossed polarizers with the entrance and exit LC director aligned with the entrance and exit polarizer, respectively. TV curves for the samples taken in this configuration are shown in FIG. 9. There is no significant difference in the electro-optic response of these two cells indicating that, not only does the RM layer have little to no effect on this response, but also that this TV response remains stable against extended light exposure.

V. Demonstrating RM-Stabilized Photoalignment in Microcavities

Figure 10:
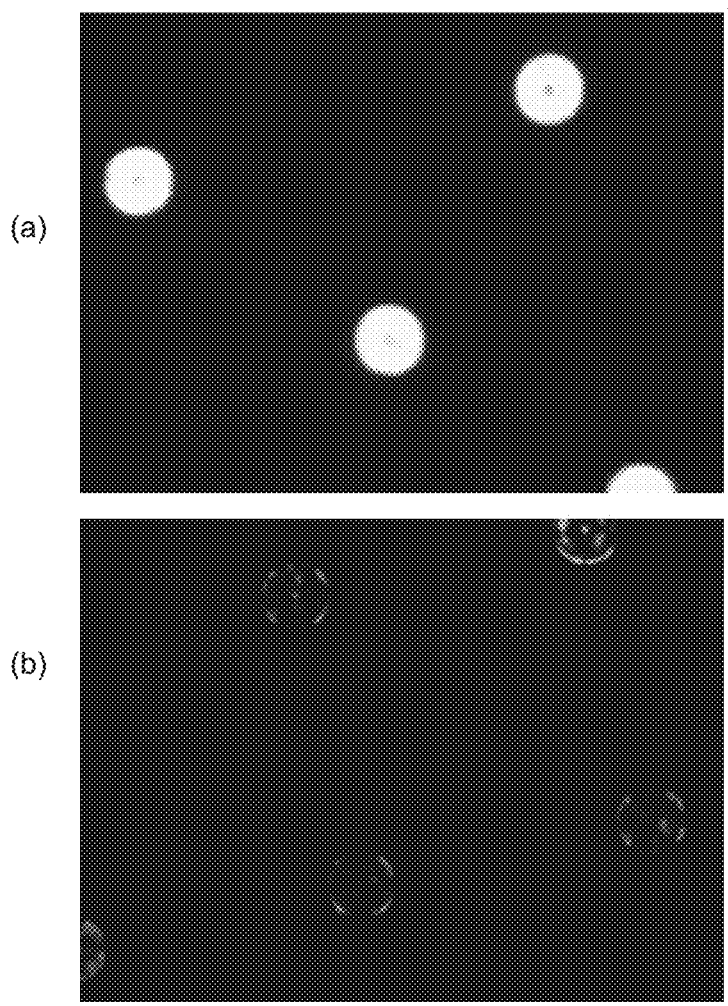
FIG. 10 shows images of bright (a) and dark (b) state of reactive mesogen (RM)-stabilized photoaligned LC in 20-µm diameter microcavities on transmissive substrate, between crossed polarizers, with image magnification of 50×.

In this section, the previous results are confirmed by demonstrating RM-stabilized photoalignment in microcavities. A microcavity sample on transmissive substrate was prepared as described above, with the LC mixed with 3% wt RM257 (with 10% wt Irgacure 651) in BL006 liquid crystal which had been vortexed for 3 minutes just prior to filling the microcavity. Note that the concentration of the RM was increased to 3% wt in this case because the microcavity samples had a thickness of 2-μm rather than the 5-μm thick cells utilized in Section III. Samples were then stored and polymerized at 0 V as described in Section III. FIG. 10 shows this sample on the microscope between crossed polarizers at fifty times in both the bright state and the dark state. Again, this sample exhibits uniform alignment. Using these images to calculate the intensity of a cavity in both its bright and dark states results in a contrast ratio of 24:1, which could be increased.

Experimental Verification of RM Polymerization and RM Photostability

A number of liquid crystal cells were prepared to verify polymerization of the RM layer or to test the photostability of cells with this polymerization. The cells were fabricated simultaneously; from the cleaning and cutting of the glass through to the fabrication of individual cells, all steps were conducted in a single day to keep substrates as clean as possible. Cells were either planar cells with rubbed-polyimide on both substrates or twist cells with rubbed-polyimide on one side and photoalignment on the other. The range of thicknesses for the planar cells were from 10-20 μm. For the twist cells, the thicknesses range from 6-15 μm.

Some cells were filled with pure BL006 liquid crystal. The rest were filled with mixtures of RM257 reactive mesogen (with ~10% photoinitiator Irgacure 651) with BL006 liquid crystal with the reactive mesogen mixed at 0.9% wt, 1.2% wt, or 1.5% wt. This results in a range of RM layer thicknesses on the substrate surfaces. After filling, all cells were stored in the dark for at least 24 hours to allow for phase separation of the RM. Then, cells were polymerized by UV light for 10 minutes; in the case of twist cells, this exposure occurred from the photoaligned side of the cell.

For this investigation, the planar cells were polymerized under a number of different conditions. Cells were either polymerized at 0 V or with a 60 Hz 100 V AC voltage applied. In the case of the high voltage, the liquid crystals in the bulk of the cell should be homeotropic (normal to the cell surface). Molecules directly next to the substrate should remain planar; the planar alignment should decay rapidly from the cell surface. In the region with polymer, this decaying alignment will be locked in by the polymerization. Once the voltage is turned off, the liquid crystal orientation on the boundary between the polymerized region and the bulk liquid crystal will become the effective pretilt of the liquid crystal cell and will be carried through the bulk. By comparing cells polymerized at 100V with those cured at 0V, one should gain a general understanding of the thickness and uniformity of the polymer layer within the cell. Additionally, two different exposure intensities were used, controlled by varying the distance of the sample from the UV source. These intensities are referred to below as "low" or "high" intensity.

Figure 11A:
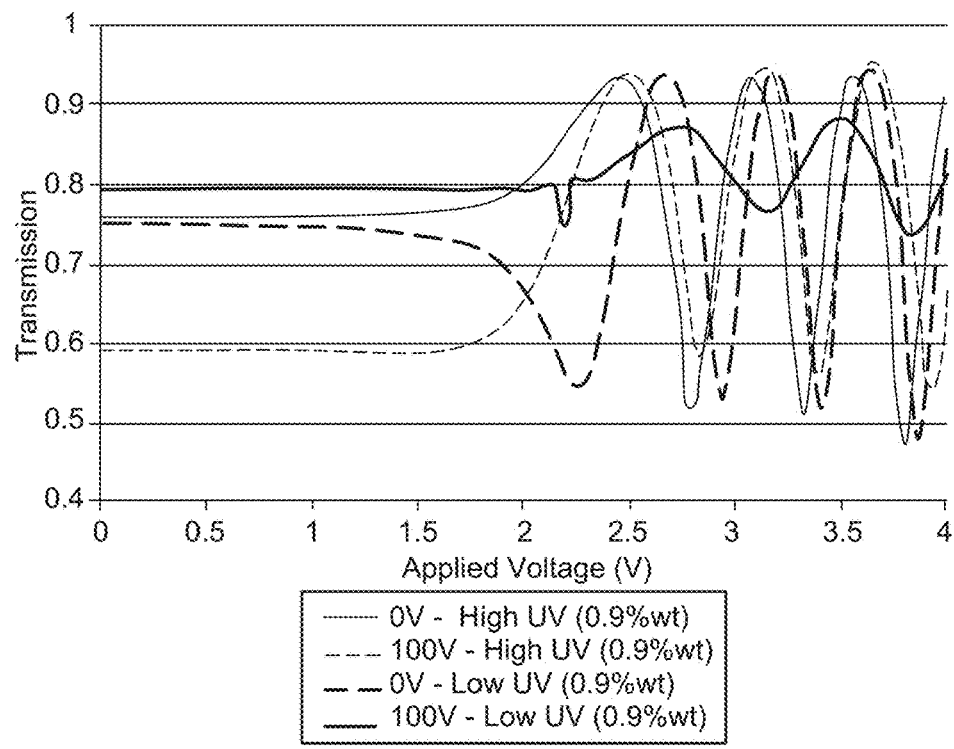
FIG. 11A is a graph showing transmission vs. voltage for various cells polymerized under low and high voltages, and under low and high UV exposures for 0.9% wt RM in BL006.
Figure 11B:
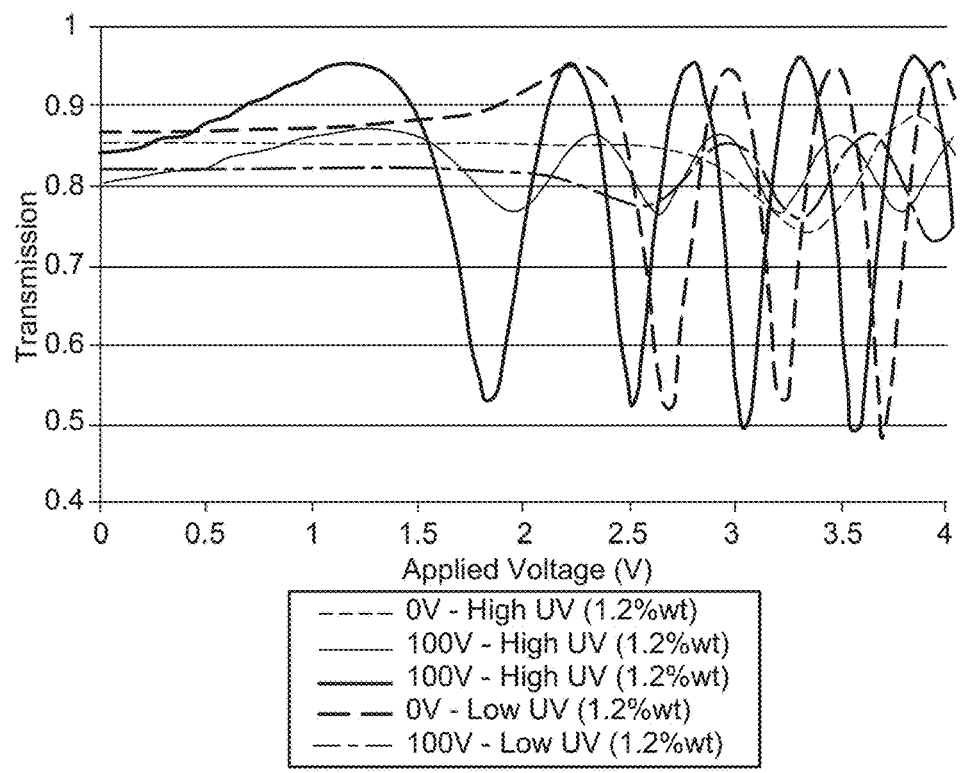
FIG. 11B is a graph showing transmission vs. voltage for various cells polymerized under low and high voltages, and under low and high UV exposures for 1.2% wt RM in BL006.
Figure 11C:
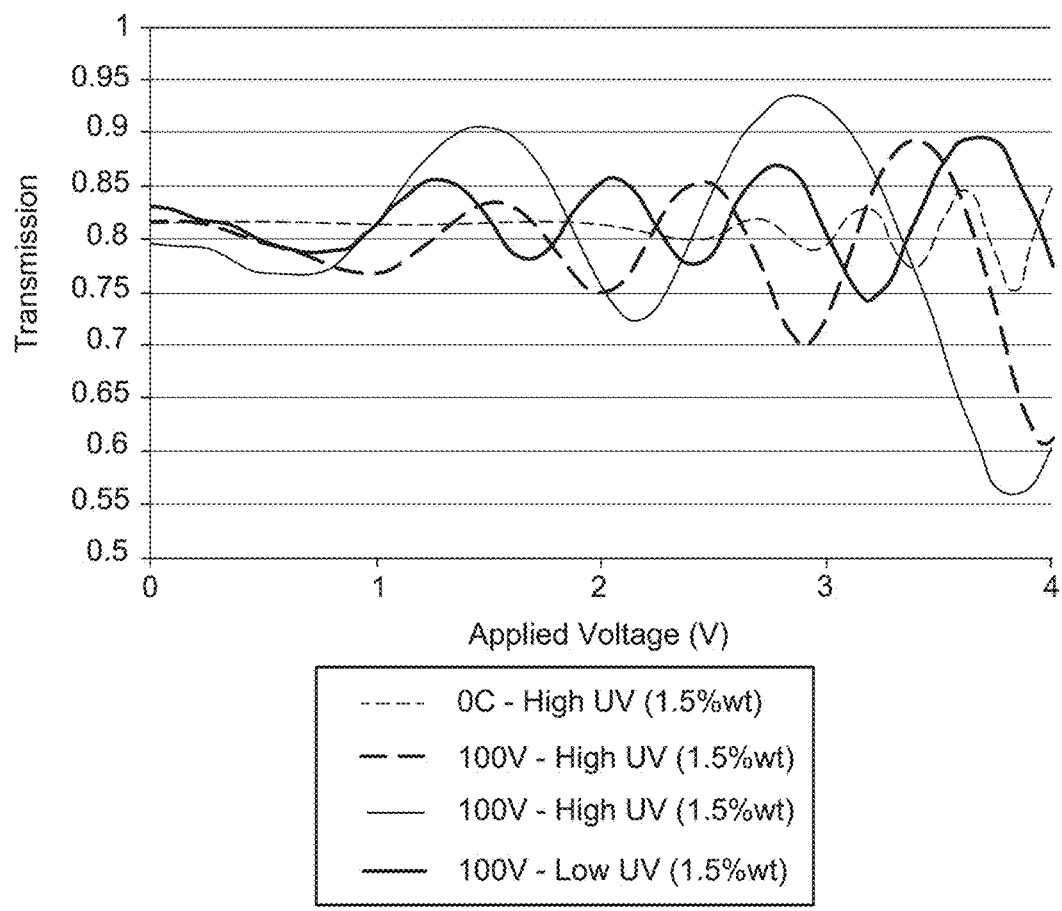
FIG. 11C is a graph showing transmission vs. voltage for various cells polymerized under low and high voltages, and under low and high UV exposures for 1.5% wt RM in BL006.

After the cells were polymerized, each was placed between parallel polarizers with the principle axis of the cell oriented at 45 degrees from the polarizer transmission axis. The transmission through the system (of 439.5 nm light) was measured at applied voltages from 0 to 5V. The plots of transmission versus voltage for a number of these cells are shown in FIGS. 11A-11C. The cell was slightly tilted during the measurement; this results in curves of small amplitude, with the thickness through the cell lacking in uniformity across the measurement region.

These curves provide an indication of the quality of the polymer layer. In particular, a lower threshold voltage indicates a higher pretilt angle, which should appear in any cell exposed at 100 V. In all but one cell exposed at 0 V, the threshold appears to be somewhere between 1.5 V and 2.0 V. The threshold is somewhat similar for all of the 100 V cells with 0.9% wt RM and for the 100V cell with 1.2% wt RM which was exposed to "low" intensity UV. Without being bound to any particular theory, this suggests that the polymer network in the 0.9% wt cells is either too thin or insufficient to create any sort of pretilt. The lack of pretilt in the "low" intensity cell with 1.2% wt RM suggests that the network in these cells is now sufficiently strong, but the "low" intensity exposure condition does not completely polymerize the layer (perhaps due to a lack of absorption by the lower concentration of photoinitiator). In the cells with 1.5% wt RM, the 100 V cells exhibit minimal threshold, indicating a high pretilt angle as is expected; this concentration produces a sufficiently thick and uniform layer.

Figure 12A:
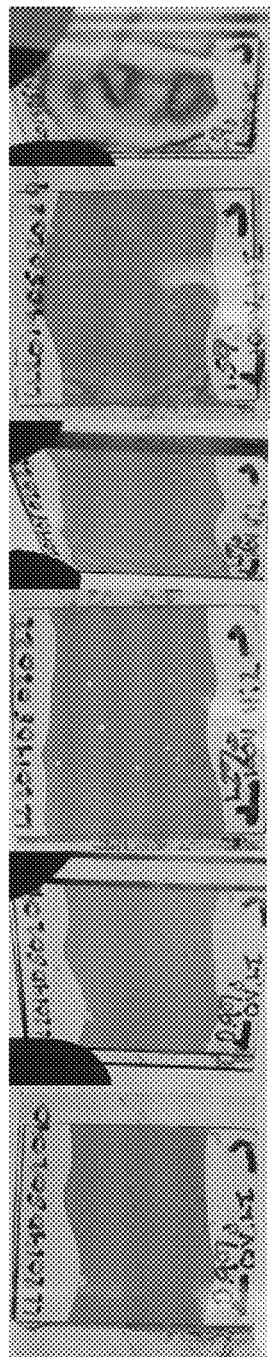
FIG. 12A is a set of images showing planar cells with 0.9% wt (left pair), 1.2% wt (center pair), or 1.5% wt (right pair) RM257 in BL006 polymerized at 60 Hz 100V.
Figure 12B:
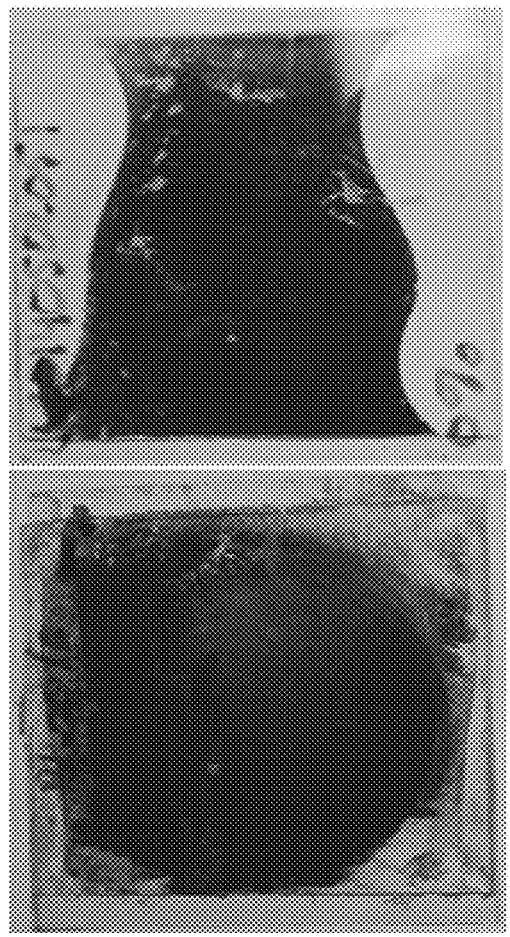
FIG. 12B is a pair of images showing hybrid twist cells filled with BL006 baked in a vacuum oven at 100 C for 45 days (left) or 7 days (right).

The differences among these cells can also be seen through visual inspection. In this case, the cell is placed between parallel polarizers, again with principle axis at 45 degrees to the transmission axis of the polarizers. Cells are viewed normal or tipped up to almost normal between the polarizers, as shown in FIGS. 12A-12B. An example cell from each RM concentration is shown; where all cells shown were polymerized at 100V. The brighter areas in the tipped-up orientation indicate a pretilt. The 0.9% wt cell shows no significant change in coloration, suggesting little to no pretilt. The 1.2% wt cell shows a slight increase in coloration while the 1.5% wt cell shows a significant increase in coloration. These results are all in agreement with the results shown in the TV curves.

The concentration of RM affects the ability to create a uniform polymer layer on the surfaces. While a polymer layer may exist in the cells with 0.9% wt, it is not sufficient to create a pretilt when polymerized at high voltage. The polymer layer begins to become sufficient at 1.2% wt and is well established at 1.5% wt. Based on these results, cells utilized in the photostability investigation were polymerized with the "high" intensity UV to create the strongest possible polymer layer at each of the given concentrations.

For another investigation, the hybrid twist cells were used, with photoalignment on one substrate and rubbed-polyimide on the other. Cells were polymerized at the "high" intensity UV discussed in the previous section. To test the photostability of these cells, they were exposed to unpolarized blue light (447 nm) at either 3 mW/cm$^2$ or 15 mW/cm$^2$ (10 mW/cm$^2$ for the case of cells with pure BL006). Three different exposure setups were used; two of these utilized a Tri-Star LED with a foil diffuser while the third utilized a single LED with collimator/diffuser. Two cells were exposed to each LED at a time (one at the high intensity, one at the low intensity). To maintain reliability of results, cells for each RM concentration were exposed using each of these three exposure stations.

FIGS. 13A and 13B show RM-stabilized planar cells between polarized crossed at +45 degrees and −45 degrees, respectively, after an additional exposure, in the liquid crystal state, to blue-light polarized at 45 degrees. The images show that the cells transmit light, which indicate that the upper and lower cell surfaces align the liquid crystal material in different directions. To create these cells, each RM-stabilized cell was placed between crossed polarizers in the liquid-crystalline state (this may not work if the liquid crystal is isotropic). Each cell was then exposed to additional blue light polarized at 45 degrees with respect to the original photoalignment direction.

CONCLUSION

A technique to generate a stable alignment utilizing a photodefinable dye and a surface-localized polymer layer has been described herein. This alignment technique is especially useful for LC applications in uniquely challenging geometry, including microcavities in photonic devices like LC thermal imagers. It has been successfully shown that a non-degrading photoalignment layer can be infused into these fully fabricated microcavities.

A low cost, robust liquid crystal alignment layer whose alignment direction and stabilization can be done after a cell or cavity is created, is demonstrated. The method can be used even if the only one entry point to the cavity is available. The procedure does not require any special coating processes such as spin coating, and does not require a high temperature bake or the difficult rub process needed for the common polyimide alignment layers.

One aspect of the disclosed methods is the stabilization of a photoaligned azo dye layer with an ultrathin reactive mesogen that layer that forms without special process steps. Surprisingly, a very small amount of reactive mesogen, mixed with the liquid crystal, may have a very significant effect on the stability of the azo dye layer. It has been demonstrated that this surface-polymer-stabilized photoalignment layer exhibits incredibly high resilience to light exposure (and is thermally stable even without the polymer-stabilization layer).

The methods described herein have a number of benefits. Stable photoalignment layers may be prepared exclusively using commercially available materials, without complicated or expensive process steps. Additionally, the robust photoalignment layer created with polarized light exposure is able to survive subsequent photoexposure for the polymerization of the reactive mesogen layer. Thus, the methods reduce the necessity for strict process control and can even allow for the use of the same exposure setup for both the patterning of the alignment layer, and the polymer stabilization of it.

The polymer-stabilization layer can be introduced into the microcavities by mixing it with the LCs at low weight concentration. A polymer layer introduced into a cell in this manner is able to naturally localize in a thin region near the substrate surfaces. This layer significantly improves the robustness of the alignment against subsequent light exposure, regardless of any degradation of the underlying photoalignment layer. The alignment process described in this here offers versatile ways to expand the field of LC photonic devices.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the technology disclosed herein may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes (e.g., of designing and making the technology disclosed above) outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of aligning liquid crystal material to an inner surface of a microcavity, the method comprising:
   forming the microcavity with a fill hole with a diameter smaller than a lateral dimension of the microcavity;
   infusing an anisotropic dye dissolved in a solvent into the microcavity via the fill hole;
   evaporating the solvent so as to coat the interior surface of the microcavity with the anisotropic dye;
   illuminating the anisotropic dye with linearly polarized light so as to form an anisotropic dye layer on the interior surface of the microcavity aligned perpendicular to a polarization axis of the linearly polarized light;
   infusing reactive mesogen, liquid crystal material, and photoinitiator into the microcavity; and
   illuminating the reactive mesogen at a wavelength selected to cause polymerization of the layer of reactive mesogen material so as to form a polymerized reactive mesogen layer aligning the liquid crystal material with respect to the anisotropic dye layer.

2. The method of claim 1, wherein infusing the anisotropic dye comprises infusing at least one of an azo dye or a dye substantially similar to an azo compound.

3. The method of claim 1, wherein infusing the anisotropic dye comprises:
   disposing the microcavity in a dye solution comprising the anisotropic dye dissolved in the solvent; and
   wherein evaporating the solvent comprises:
   heating the microcavity so as to evaporate the solvent.

4. The method of claim 1, wherein infusing the reactive mesogen, the liquid crystal material, and the photoinitiator comprises infusing RM257.

5. The method of claim 1, wherein the reactive mesogen, the liquid crystal material, and the photoinitiator form a mixture having a weight ratio of reactive mesogen to liquid crystal material to photoinitiator of about 1.35 to 98.50 to 0.15.

6. The method of claim 1, further comprising:
   heating and mixing the reactive mesogen, the liquid crystal material, and the photoinitiator prior to infusing the reactive mesogen, the liquid crystal material, and the photoinitiator into the microcavity.

7. The method of claim 1, further comprising:
   allowing the reactive mesogen to separate from the liquid crystal material before illuminating the reactive mesogen.

8. The method of claim 1, wherein illuminating the reactive mesogen further comprises:
   applying at least one voltage across at least a portion of the microcavity while illuminating the reactive mesogen so as to lock in alignment of the polymerized reactive mesogen layer with respect to the anisotropic dye layer.

9. The method of claim 8, wherein applying the at least one voltage comprises:
   applying a first voltage across a first portion of the microcavity and a second voltage across a second portion of the microcavity so as to create spatially varying alignment of the anisotropic dye to the liquid crystal material.

10. The method of claim 1, wherein the polymerized reactive mesogen layer has a thickness of less than approximately 100 nanometers.

11. The method of claim 1, further comprising:
   wherein illuminating the reactive mesogen comprises illuminating the reactive mesogen with ultraviolet light.

12. The method of claim 1, wherein infusing the reactive mesogen, the liquid crystal material, and the photoinitiator comprises infusing Irgacure 651.

\* \* \* \* \*